(12) United States Patent
Gao

(10) Patent No.: US 12,213,140 B2
(45) Date of Patent: Jan. 28, 2025

(54) TRANSMISSION METHOD, RECEPTION METHOD, TERMINAL AND NETWORK DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 460 days.

(21) Appl. No.: 17/431,137

(22) PCT Filed: Feb. 14, 2020

(86) PCT No.: PCT/CN2020/075223
§ 371 (c)(1),
(2) Date: Aug. 13, 2021

(87) PCT Pub. No.: WO2020/164573
PCT Pub. Date: Aug. 20, 2020

(65) Prior Publication Data
US 2022/0141817 A1 May 5, 2022

(30) Foreign Application Priority Data
Feb. 15, 2019 (CN) .......................... 201910117871.4

(51) Int. Cl.
*H04W 72/21* (2023.01)
*H04L 1/1829* (2023.01)
*H04W 72/044* (2023.01)

(52) U.S. Cl.
CPC ........... *H04W 72/21* (2023.01); *H04L 1/1864* (2013.01); *H04W 72/044* (2013.01)

(58) Field of Classification Search
CPC . H04W 72/21; H04W 72/044; H04W 72/569; H04W 72/23; H04W 72/1268;
(Continued)

(56) References Cited

U.S. PATENT DOCUMENTS

2014/0369290 A1* 12/2014 Yang ..................... H04L 1/0073
370/329
2015/0036618 A1 2/2015 Xu et al.
(Continued)

FOREIGN PATENT DOCUMENTS

CN 102263617 A 11/2011
CN 103188061 A 7/2013
(Continued)

OTHER PUBLICATIONS

Vivo, "Remaining issues on UL data transmission procedure", R1-1800204, 3GPP TSG RAN WG1 Meeting AH 1801, Vancouver, Canada, Jan. 22-26, 2018, all pages.
(Continued)

*Primary Examiner* — Dady Chery
(74) *Attorney, Agent, or Firm* — Ladas & Parry, LLP

(57) ABSTRACT

A transmission method, a reception method, a terminal and a network device are provided. The transmission method for the terminal includes: receiving configuration information transmitted from a network device, to obtain a configuration parameter of a Grant-Free (GF) Physical Uplink Shared Channel (PUSCH); performing PUSCH transmission in accordance with the configuration parameter, wherein the configuration parameter is configured based on an existence of A bits of first Uplink Control information (UCI) to be transmitted on the PUSCH, and the A represents a predetermined quantity of bits; or determining a PUSCH transmission resource in accordance with the configuration parameter and whether there is the first UCI to be transmit-
(Continued)

ted on the PUSCH, and performing PUSCH transmission on the determined PUSCH transmission resource.

12 Claims, 2 Drawing Sheets

(58) Field of Classification Search
CPC .... H04W 72/20; H04L 1/1864; H04L 5/0094; H04L 5/0046; H04L 5/0053; H04L 5/0044; H04L 5/0007
See application file for complete search history.

(56) References Cited

U.S. PATENT DOCUMENTS

| | | | |
|---|---|---|---|
| 2017/0135090 A1 | 5/2017 | Yin et al. | |
| 2018/0167161 A1* | 6/2018 | Davydov | H04L 1/0001 |
| 2019/0327037 A1 | 10/2019 | Yoshimoto et al. | |
| 2020/0213901 A1* | 7/2020 | Yoshimoto | H04L 5/0048 |
| 2021/0282131 A1* | 9/2021 | Xu | H04L 1/0028 |

FOREIGN PATENT DOCUMENTS

| | | |
|---|---|---|
| CN | 108476103 A | 8/2018 |
| WO | 2018128086 A1 | 7/2018 |
| WO | 2018130740 A1 | 7/2018 |
| WO | 2018230701 A1 | 12/2018 |
| WO | 2019/029547 A1 | 2/2019 |
| WO | 2019/029591 A1 | 2/2019 |

OTHER PUBLICATIONS

CATT, "Considerations on UCI multiplexing for NR URLLC", R1-1806297, 3GPP TSG RAN WG1 Meeting #93, Busan, Korea, May 21-25, 2018, all pages.
CATR, "Remaining issues on UCI multiplexing on PUSCH", R1-1807202, 3GPP TSG RAN WG1 Meeting #93, Busan, Korea, May 21-25, 2018, all pages.
International Search Report from PCT/CN2020/075223, dated May 11, 2020, with English translation from WIPO, all pages.
Written Opinion of the International Searching Authority from PCT/CN2020/075223, dated May 11, 2020, with English translation from WIPO, all pages.
International Preliminary Report on Patentability from PCT/CN2020/075223, dated Aug. 10, 2021, with English translation from WIPO, all pages.
Extended European Search Report for European Patent Application 20756293.5, issued on Mar. 17, 2022.
First Chinese Office Action for Chinese Patent Application 201910117871.4 issued on Oct. 12, 2022 and its English Translation provided by global dossier.
"Remaining issues on PUCCH structure in long-duration" 3GPP TSG RAN WG1 Meeting #92 R1-1801340, Athens, Greece, Feb. 26-Mar. 2, 2018, Agenda Item: 7.1.3.2.2, Source: Huawei, HiSilicon.
"Offline summary for AI 7.1.3.3.4 UL data transmission procedure" 3GPP TSG RAN WG1 Meeting #92 R1-1803295, Athens, Greece, Feb. 26-Mar. 2, 2018, Source:NTT Docomo, Inc.
"Discussion on partial overlap between PUCCH and PUCCH/PUSCH" 3GPP TSG RAN WG1 Meeting #93 R1-1806882, Busan, Korea, May 21-25, 2018, Agenda Item: 7.1.3.2.5, Source: Huawei, HiSilicon.
First Korean Office Action for the corresponding Korean Patent Application No. 10-2021-7028052 issued by the Korean Patent Office on Jul. 18, 2023 and its English translation provided by the foreign associate.
"Remaining issues on grant-free UL transmission," 3GPP TSG RAN WG1 Meeting #92 R1-1801738, Athens, Greece, Feb. 26-Mar. 2, 2018, Source: CATT, Agenda Item: 7.1.3.3.4, all pages.
"UCI transmission on grant free PUSCH," R1-1801907 3GPP TSG RAN WG1 Meeting #92, Athens, Greece, Feb. 26-Mar. 2, 2018, Source: CATR, Agenda Item: 7. 1. 3. 3. 4, all pages.
Office action from corresponding Indian Patent Application No. 202127037442 dated Sep. 6, 2024.

* cited by examiner

TRANSMISSION METHOD, RECEPTION METHOD, TERMINAL AND NETWORK DEVICE

CROS-REFERENCE TO RELATED APPLICATIONS

This application is the U.S. national phase of PCT Application No. PCT/CN2020/075223 filed on Feb. 14, 2020, which claims a priority of the Chinese patent application No. 201910117871.4 filed in China on Feb. 15, 2019, the disclosure of which are incorporated herein by reference in their entireties.

TECHNICAL FIELD

The present disclosure relates to the field of communications technology, in particular to a transmission method, a reception method, a terminal and a network device.

BACKGROUND

In New Radio Access Technologies (NR) R16, a terminal may support various service types simultaneously, e.g., enhanced Mobile Broadband (eMBB) and Ultra Reliably & Low Latency Communications (URLLC).

When a Physical Uplink Control Channel (PUCCH) carrying a Hybrid Automatic Repeat reQuest Acknowledgement (HARQ-ACK, including HARQ-ACK/NACK) overlaps a Grant-Free (GF) Physical Uplink Shared Channel (PUSCH), a GF PUSCH resource is configured semi-statically, and it cannot change dynamically. When the HARQ-ACK needs to be transferred to be transmitted on the PUSCH, the HARQ-ACK may probably occupy a part of the PUSCH resources, and thereby the transmission performance of data carried on the PUSCH is adversely affected. Especially when the PUSCH carries URLLC data where the reliability may be highly demanded, the transmission reliability is reduced due to a decrease in the transmission resources. However, the HARQ-ACK is also important, and especially when the HARQ-ACK also corresponds to the URLLC, it is unable to ensure the transmission reliability of the PUSCH through discarding the HARQ-ACK. Currently, there is no definite scheme about the transmission when the HARQ-ACK overlaps the Grant-Free (GF) PUSCH.

SUMMARY

An object of the present disclosure is to provide a transmission method, a reception method, a terminal and a network device, so as to solve the problem in the related art where the performance of the PUSCH transmission is adversely affected when the HARQ-ACK transmission overlaps the GF PUSCH transmission and an existing transmission processing mode is adopted, and thereby it is impossible to ensure the transmission reliability.

In one aspect, the present disclosure provides in some embodiments a transmission method for a terminal, including:

receiving configuration information transmitted from a network device, to obtain a configuration parameter of a Grant-Free (GF) Physical Uplink Shared Channel (PUSCH);

performing PUSCH transmission in accordance with the configuration parameter, wherein the configuration parameter is configured based on an existence of A bits of first Uplink Control information (UCI) to be transmitted on the PUSCH, and the A represents a predetermined quantity of bits; or determining a PUSCH transmission resource in accordance with the configuration parameter and whether there is the first UCI to be transmitted on the PUSCH, and performing PUSCH transmission on the determined PUSCH transmission resource.

In a possible embodiment of the present disclosure, performing the PUSCH transmission in accordance with the configuration parameter includes:

when the first UCI does not need to be transmitted on the PUSCH, determining the PUSCH transmission resource in accordance with the configuration parameter, and performing the PUSCH transmission on the determined PUSCH transmission resource; or when the first UCI needs to be transmitted on the PUSCH, determining the PUSCH transmission resource in accordance with the configuration parameter, and performing the PUSCH transmission on the determined PUSCH transmission resource, wherein the PUSCH carries the first UCI.

In a possible embodiment of the present disclosure, the determining the PUSCH transmission resource in accordance with the configuration parameter and whether there is the first UCI to be transmitted on the PUSCH and performing the PUSCH transmission on the determined PUSCH transmission resource includes:

the configuration parameter includes at least two PUSCH resources;

when the first UCI does not need to be transmitted on the PUSCH, performing the PUSCH transmission on a first PUSCH resource in the at least two PUSCH resources;

when the first UCI needs to be transmitted on the PUSCH, performing the PUSCH transmission on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource includes more than one PUSCH resource, different PUSCH resources in the second PUSCH resource are used to transmit the first UCIs having different quantities of bits, wherein sizes of different PUSCH resources in the second PUSCH resource are different.

In a possible embodiment of the present disclosure, the A is an integer greater than or equal to 1.

In a possible embodiment of the present disclosure, the determining the PUSCH transmission resource in accordance with the configuration parameter and whether there is the first UCI to be transmitted on the PUSCH and performing the PUSCH transmission on the determined PUSCH transmission resource includes:

when the first UCI does not need to be transmitted on the PUSCH, determining the PUSCH transmission resource in accordance with the configuration parameter, and performing the PUSCH transmission on the determined PUSCH transmission resource;

when the first UCI needs to be transmitted on the PUSCH, determining the PUSCH transmission resource in accordance with the configuration parameter, determining a target PUSCH transmission resource in accordance with the determined PUSCH transmission resource and an additional resource, and performing the PUSCH transmission on the target PUSCH transmission resource, wherein the PUSCH carries the first UCI.

In a possible embodiment of the present disclosure, determining the target PUSCH transmission resource in accordance with the determined PUSCH transmission resource and the additional resource includes:

the additional resource includes X1 Orthogonal Frequency Division Multiplexing (OFDM) symbols; adding X1 OFDM symbols before a first OFDM symbol of the determined PUSCH transmission resource, to obtain the target PUSCH transmission resource; or adding X1 OFDM symbols after a last OFDM symbol of the determined PUSCH transmission resource, to obtain the target PUSCH transmission resource; or adding X11 OFDM symbols before the first OFDM symbol of the determined PUSCH transmission resource, and adding X12 OFDM symbols after the last OFDM symbol of the determined PUSCH transmission resource, to obtain the target PUSCH transmission resource, where X11+X12=X1.

In a possible embodiment of the present disclosure, determining the target PUSCH transmission resource in accordance with the determined PUSCH transmission resource and the additional resource includes:

the additional resource includes X2 Resource Blocks (RBs); adding X2 RBs before a first RB of the determined PUSCH transmission resource, to obtain the target PUSCH transmission resource; or adding X2 RBs after a last RB of the determined PUSCH transmission resource, to obtain the target PUSCH transmission resource; or adding X21 RBs before a first RB of the determined PUSCH transmission resource and adding X22 RBs after a last RB of the determined PUSCH transmission resource, to obtain the target PUSCH transmission resource, where X21+X22=X2.

In a possible embodiment of the present disclosure, a size of the additional resource is pre-defined in a protocol, configured through signaling, or determined in accordance with a requirement on the transmission of the first UCI.

In a possible embodiment of the present disclosure, the first UCI and the PUSCH satisfy at least one of following conditions:

a first condition where the first UCI is at least one of a Hybrid Automatic Repeat reQuest Acknowledgement (HARQ-ACK) or Channel State Information (CSI), and the PUSCH corresponds to a first type of service or a second type of service;

a second condition where the first UCI is at least one of an HARQ-ACK corresponding to the first type of service or CSI corresponding to the first type of service, and the PUSCH corresponds to the first type of service;

a third condition where the first UCI is at least one of an HARQ-ACK corresponding to a second type of service or CSI corresponding to the second type of service, and the PUSCH corresponds to the first type of service or the second type of service.

In a possible embodiment of the present disclosure, the first type of service is at least one of a service having a high priority level or a high significance level, or a Ultra Reliably & Low Latency Communications (URLLC) service;

the second type of service is at least one of a service having a low priority level or a low significance level, an enhanced Mobile Broadband (eMBB) service, or a non-URLLC service.

In a possible embodiment of the present disclosure, the priority level, the significance level or the type of service is determined in accordance with at least one of:

a Downlink Control Information (DCI) format, a DCI size, a Radio Network Temporary Identity (RNTI), a search space, a control resource set, a beam, a Block Error Rate (BLER), a Channel Quality Indicator (CQI) table, a Modulation and Coding Scheme (MCS) table, a priority level identifier, a Physical Uplink Control Channel (PUCCH) resource, or a Scheduling Request (SR) configuration index number.

In another aspect, the present disclosure provides in some embodiments a reception method for a network device, including:

transmitting configuration information to a terminal, wherein the configuration information carries a configuration parameter of a Grant-Free (GF) Physical Uplink Shared Channel (PUSCH);

receiving PUSCH in accordance with the configuration parameter, wherein the configuration parameter is configured based on an existence of A bits of first Uplink Control information (UCI) to be transmitted on the PUSCH, and the A represents a predetermined quantity of bits; or determining a PUSCH transmission resource in accordance with the configuration parameter and whether there is the first UCI to be transmitted on the PUSCH, and receiving PUSCH on the determined PUSCH transmission resource.

In a possible embodiment of the present disclosure, the receiving PUSCH in accordance with the configuration parameter includes:

when the first UCI does not need to be transmitted on the PUSCH, determining the PUSCH transmission resource in accordance with the configuration parameter, and receiving the PUSCH on the determined PUSCH transmission resource; or when the first UCI needs to be transmitted on the PUSCH, determining the PUSCH transmission resource in accordance with the configuration parameter, and receiving the PUSCH on the determined PUSCH transmission resource, wherein the PUSCH carries the first UCI.

In a possible embodiment of the present disclosure, the determining the PUSCH transmission resource in accordance with the configuration parameter and whether there is the first UCI to be transmitted on the PUSCH and receiving the PUSCH on the determined PUSCH transmission resource includes:

the configuration parameter includes at least two PUSCH resources;

when the first UCI does not need to be transmitted on the PUSCH, receiving the PUSCH on a first PUSCH resource in the at least two PUSCH resources;

when the first UCI needs to be transmitted on the PUSCH, receiving the PUSCH on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource includes more than one PUSCH resource, different PUSCH resources in the second PUSCH resource are used to receive the first UCIs having different quantities of bits, wherein sizes of different PUSCH resources in the second PUSCH resource are different.

In a possible embodiment of the present disclosure, the A is an integer greater than or equal to 1.

In a possible embodiment of the present disclosure, the determining the PUSCH transmission resource in accordance with the configuration parameter and whether there is the first UCI to be transmitted on the PUSCH and receiving the PUSCH on the determined PUSCH transmission resource includes:

when the first UCI does not need to be transmitted on the PUSCH, determining the PUSCH transmission resource in accordance with the configuration parameter, and receiving the PUSCH on the determined PUSCH transmission resource;

when the first UCI needs to be transmitted on the PUSCH, determining the PUSCH transmission resource in accordance with the configuration parameter, determining a target PUSCH transmission resource in accordance with the determined PUSCH transmission resource and an additional resource, and receiving the PUSCH on the target PUSCH transmission resource, wherein the PUSCH carries the first UCI.

In a possible embodiment of the present disclosure, determining the target PUSCH transmission resource in accordance with the determined PUSCH transmission resource and the additional resource includes:

the additional resource includes X1 Orthogonal Frequency Division Multiplexing (OFDM) symbols; adding X1 OFDM symbols before a first OFDM symbol of the determined PUSCH transmission resource, to obtain the target PUSCH transmission resource; or adding X1 OFDM symbols after a last OFDM symbol of the determined PUSCH transmission resource, to obtain the target PUSCH transmission resource; or adding X11 OFDM symbols before the first OFDM symbol of the determined PUSCH transmission resource, and adding X12 OFDM symbols after the last OFDM symbol of the determined PUSCH transmission resource, to obtain the target PUSCH transmission resource, where X11+X12=X1.

In a possible embodiment of the present disclosure, determining the target PUSCH transmission resource in accordance with the determined PUSCH transmission resource and the additional resource includes:

the additional resource includes X2 Resource Blocks (RBs); adding X2 RBs before a first RB of the determined PUSCH transmission resource, to obtain the target PUSCH transmission resource; or adding X2 RBs after a last RB of the determined PUSCH transmission resource, to obtain the target PUSCH transmission resource; or adding X21 RBs before a first RB of the determined PUSCH transmission resource and adding X22 RBs after a last RB of the determined PUSCH transmission resource, to obtain the target PUSCH transmission resource, where X21+X22=X2.

In a possible embodiment of the present disclosure, a size of the additional resource is pre-defined in a protocol, or configured through signaling, or determined in accordance with a requirement on transmission of the first UCI.

In a possible embodiment of the present disclosure, the first UCI and the PUSCH satisfy at least one of following conditions:

a first condition where the first UCI is at least one of a Hybrid Automatic Repeat reQuest Acknowledgement (HARQ-ACK) or Channel State Information (CSI), and the PUSCH corresponds to a first type of service or a second type of service;

a second condition where the first UCI is at least one of an HARQ-ACK corresponding to the first type of service or CSI corresponding to the first type of service, and the PUSCH corresponds to the first type of service;

a third condition where the first UCI is at least one of an HARQ-ACK corresponding to a second type of service or CSI corresponding to the second type of service, and the PUSCH corresponds to the first type of service or the second type of service.

In a possible embodiment of the present disclosure, the first type of service is at least one of a service having a high priority level or a high significance level, or a Ultra Reliably & Low Latency Communications (URLLC) service;

the second type of service is at least one of a service having a low priority level or a low significance level, an enhanced Mobile Broadband (eMBB) service, or a non-URLLC service.

In a possible embodiment of the present disclosure, the priority level, the significance level or the type of service is determined in accordance with at least one of:

a Downlink Control Information (DCI) format, a DCI size, a Radio Network Temporary Identity (RNTI), a search space, a control resource set, a beam, a Block Error Rate (BLER), a Channel Quality Indicator (CQI) table, a Modulation and Coding Scheme (MCS) table, a priority level identifier, a Physical Uplink Control Channel (PUCCH) resource, or a Scheduling Request (SR) configuration index number.

In yet another aspect, the present disclosure provides in some embodiments a terminal, including a transceiver, a memory, a processor, and a program stored in the memory and capable of being executed by the processor, wherein the processor is configured to execute the program to:

receive configuration information transmitted from a network device, to obtain a configuration parameter of a Grant-Free (GF) Physical Uplink Shared Channel (PUSCH);

perform PUSCH transmission in accordance with the configuration parameter, wherein the configuration parameter is configured based on an existence of A bits of first Uplink Control information (UCI) to be transmitted on the PUSCH, and the A represents a predetermined quantity of bits; or determine a PUSCH transmission resource in accordance with the configuration parameter and whether there is the first UCI to be transmitted on the PUSCH, and performing PUSCH transmission on the determined PUSCH transmission resource.

In a possible embodiment of the present disclosure, when the processor executes the program to perform PUSCH transmission in accordance with the configuration parameter, the processor is configured to execute the program to:

when the first UCI does not need to be transmitted on the PUSCH, determine the PUSCH transmission resource in accordance with the configuration parameter, and perform the PUSCH transmission on the determined PUSCH transmission resource; or when the first UCI needs to be transmitted on the PUSCH, determine the PUSCH transmission resource in accordance with the configuration parameter, and perform the PUSCH transmission on the determined PUSCH transmission resource, wherein the PUSCH carries the first UCI.

In a possible embodiment of the present disclosure, when the processor executes the program to determine the PUSCH transmission resource in accordance with the configuration parameter and whether there is the first UCI to be transmitted on the PUSCH and perform the PUSCH transmission on the determined PUSCH transmission resource, the processor is configured to execute the program to:
the configuration parameter includes at least two PUSCH resources;
when the first UCI does not need to be transmitted on the PUSCH, perform the PUSCH transmission on a first PUSCH resource in the at least two PUSCH resources;
when the first UCI needs to be transmitted on the PUSCH, perform the PUSCH transmission on a second PUSCH resource in the at least two PUSCH resources, wherein the PUSCH carries the first UCI,
wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource includes more than one PUSCH resource, different PUSCH resources in the second PUSCH resource are used to transmit the first UCIs having different quantities of bits,
wherein sizes of different PUSCH resources in the second PUSCH resource are different.

In a possible embodiment of the present disclosure, the A is an integer greater than or equal to 1.

In a possible embodiment of the present disclosure, when the processor executes the program to determine the PUSCH transmission resource in accordance with the configuration parameter and whether there is the first UCI to be transmitted on the PUSCH and perform the PUSCH transmission on the determined PUSCH transmission resource, the processor is configured to execute the program to:
when the first UCI does not need to be transmitted on the PUSCH, determine the PUSCH transmission resource in accordance with the configuration parameter, and perform the PUSCH transmission on the determined PUSCH transmission resource;
when the first UCI needs to be transmitted on the PUSCH, determine the PUSCH transmission resource in accordance with the configuration parameter, determine a target PUSCH transmission resource in accordance with the determined PUSCH transmission resource and an additional resource, and perform the PUSCH transmission on the target PUSCH transmission resource, wherein the PUSCH carries the first UCI.

In a possible embodiment of the present disclosure, the processor is configured to execute the program to:
the additional resource includes X1 Orthogonal Frequency Division Multiplexing (OFDM) symbols; add X1 OFDM symbols before a first OFDM symbol of the determined PUSCH transmission resource, to obtain the target PUSCH transmission resource; or add X1 OFDM symbols after a last OFDM symbol of the determined PUSCH transmission resource, to obtain the target PUSCH transmission resource; or add X11 OFDM symbols before the first OFDM symbol of the determined PUSCH transmission resource, and add X12 OFDM symbols after the last OFDM symbol of the determined PUSCH transmission resource, to obtain the target PUSCH transmission resource, where X11+X12=X1.

In a possible embodiment of the present disclosure, the processor is configured to execute the program to:
the additional resource includes X2 Resource Blocks (RBs); add X2 RBs before a first RB of the determined PUSCH transmission resource, to obtain the target PUSCH transmission resource; or add X2 RBs after a last RB of the determined PUSCH transmission resource, to obtain the target PUSCH transmission resource; or add X21 RBs before a first RB of the determined PUSCH transmission resource and add X22 RBs after a last RB of the determined PUSCH transmission resource, to obtain the target PUSCH transmission resource, where X21+X22=X2.

In a possible embodiment of the present disclosure, a size of the additional resource is pre-defined in a protocol, or configured through signaling, or determined in accordance with a requirement on transmission of the first UCI.

In a possible embodiment of the present disclosure, the first UCI and the PUSCH satisfy at least one of following conditions:
a first condition where the first UCI is at least one of a Hybrid Automatic Repeat reQuest Acknowledgement (HARQ-ACK) or Channel State Information (CSI), and the PUSCH corresponds to a first type of service or a second type of service;
a second condition where the first UCI is at least one of an HARQ-ACK corresponding to the first type of service or CSI corresponding to the first type of service, and the PUSCH corresponds to the first type of service;
a third condition where the first UCI is at least one of an HARQ-ACK corresponding to a second type of service or CSI corresponding to the second type of service, and the PUSCH corresponds to the first type of service or the second type of service.

In a possible embodiment of the present disclosure, the first type of service is at least one of a service having a high priority level or a high significance level, or a Ultra Reliably & Low Latency Communications (URLLC) service;
the second type of service is at least one of a service having a low priority level or a low significance level, an enhanced Mobile Broadband (eMBB) service, or a non-URLLC service.

In a possible embodiment of the present disclosure, the priority level, the significance level or the type of service is determined in accordance with at least one of:
a Downlink Control Information (DCI) format, a DCI size, a Radio Network Temporary Identity (RNTI), a search space, a control resource set, a beam, a Block Error Rate (BLER), a Channel Quality Indicator (CQI) table, a Modulation and Coding Scheme (MCS) table, a priority level identifier, a Physical Uplink Control Channel (PUCCH) resource, or a Scheduling Request (SR) configuration index number.

In still yet another aspect, the present disclosure provides in some embodiments a network device, including a transceiver, a memory, a processor, and a program stored in the memory and capable of being executed by the processor, wherein the processor is configured to read the program to:
transmit configuration information to a terminal, wherein the configuration information carries a configuration parameter of a Grant-Free (GF) Physical Uplink Shared Channel (PUSCH);
receive PUSCH in accordance with the configuration parameter, wherein the configuration parameter is configured based on an existence of A bits of first Uplink Control information (UCI) to be transmitted on the PUSCH, and the A represents a predetermined quantity of bits; or determine a PUSCH transmission resource in accordance with the configuration parameter and whether there is the first UCI to be transmitted on the PUSCH, and receive PUSCH on the determined PUSCH transmission resource.

In a possible embodiment of the present disclosure, when the processor executes the program to receive PUSCH in accordance with the configuration parameter, the processor is configured to execute the program to:
- when the first UCI does not need to be transmitted on the PUSCH, determine the PUSCH transmission resource in accordance with the configuration parameter, and receive the PUSCH on the determined PUSCH transmission resource; or
- when the first UCI needs to be transmitted on the PUSCH, determine the PUSCH transmission resource in accordance with the configuration parameter, and receive the PUSCH on the determined PUSCH transmission resource, wherein the PUSCH carries the first UCI.

In a possible embodiment of the present disclosure, when the processor executes the program to determine the PUSCH transmission resource in accordance with the configuration parameter and whether there is the first UCI to be transmitted on the PUSCH, and receive the PUSCH on the determined PUSCH transmission resource, the processor is configured to execute the program to:
- the configuration parameter includes at least two PUSCH resources;
- when the first UCI does not need to be transmitted on the PUSCH, receive the PUSCH on a first PUSCH resource in the at least two PUSCH resources;
- when the first UCI needs to be transmitted on the PUSCH, receive the PUSCH on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource includes more than one PUSCH resource, different PUSCH resources in the second PUSCH resource are used to receive the first UCIs having different quantities of bits,
wherein sizes of different PUSCH resources in the second PUSCH resource are different.

In a possible embodiment of the present disclosure, the A is an integer greater than or equal to 1.

In a possible embodiment of the present disclosure, the processor executes the program to determine the PUSCH transmission resource in accordance with the configuration parameter and whether there is the first UCI to be transmitted on the PUSCH, and receive the PUSCH on the determined PUSCH transmission resource, the processor is configured to execute the program to:
- when the first UCI does not need to be transmitted on the PUSCH, determine the PUSCH transmission resource in accordance with the configuration parameter, and receive the PUSCH on the determined PUSCH transmission resource;
- when the first UCI needs to be transmitted on the PUSCH, determine the PUSCH transmission resource in accordance with the configuration parameter, determine a target PUSCH transmission resource in accordance with the determined PUSCH transmission resource and an additional resource, and receive the PUSCH on the target PUSCH transmission resource, wherein the PUSCH carries the first UCI.

In a possible embodiment of the present disclosure, the processor is configured to execute the program to:
- the additional resource includes X1 Orthogonal Frequency Division Multiplexing (OFDM) symbols; add X1 OFDM symbols before a first OFDM symbol of the determined PUSCH transmission resource, to obtain the target PUSCH transmission resource; or add X1 OFDM symbols after a last OFDM symbol of the determined PUSCH transmission resource, to obtain the target PUSCH transmission resource; or add X11 OFDM symbols before the first OFDM symbol of the determined PUSCH transmission resource, and add X12 OFDM symbols after the last OFDM symbol of the determined PUSCH transmission resource, to obtain the target PUSCH transmission resource, where X11+X12=X1.

In a possible embodiment of the present disclosure, the processor is configured to execute the program to:
- the additional resource includes X2 Resource Blocks (RBs); add X2 RBs before a first RB of the determined PUSCH transmission resource, to obtain the target PUSCH transmission resource; or add X2 RBs after a last RB of the determined PUSCH transmission resource, to obtain the target PUSCH transmission resource; or add X21 RBs before a first RB of the determined PUSCH transmission resource and add X22 RBs after a last RB of the determined PUSCH transmission resource, to obtain the target PUSCH transmission resource, where X21+X22=X2.

In a possible embodiment of the present disclosure, a size of the additional resource is pre-defined in a protocol, or configured through signaling, or determined in accordance with a requirement on transmission of the first UCI.

In a possible embodiment of the present disclosure, the first UCI and the PUSCH satisfy at least one of following conditions:
- a first condition where the first UCI is at least one of a Hybrid Automatic Repeat reQuest Acknowledgement (HARQ-ACK) or Channel State Information (CSI), and the PUSCH corresponds to a first type of service or a second type of service;
- a second condition where the first UCI is at least one of an HARQ-ACK corresponding to the first type of service or CSI corresponding to the first type of service, and the PUSCH corresponds to the first type of service;
- a third condition where the first UCI is at least one of an HARQ-ACK corresponding to a second type of service or CSI corresponding to the second type of service, and the PUSCH corresponds to the first type of service or the second type of service.

In a possible embodiment of the present disclosure, the first type of service is at least one of a service having a high priority level or a high significance level, or a Ultra Reliably & Low Latency Communications (URLLC) service;
the second type of service is at least one of a service having a low priority level or a low significance level, an enhanced Mobile Broadband (eMBB) service, or a non-URLLC service.

In a possible embodiment of the present disclosure, the priority level, the significance level or the type of service is determined in accordance with at least one of:
- a Downlink Control Information (DCI) format, a DCI size, a Radio Network Temporary Identity (RNTI), a search space, a control resource set, a beam, a Block Error Rate (BLER), a Channel Quality Indicator (CQI) table, a Modulation and Coding Scheme (MCS) table, a priority level identifier, a Physical Uplink Control Channel (PUCCH) resource, or a Scheduling Request (SR) configuration index number.

In still yet another aspect, the present disclosure provides in some embodiments a computer-readable storage medium storing therein a program. The program is executed by a processor so as to implement the above-mentioned transmission method or reception method.

In still yet another aspect, the present disclosure provides in some embodiments a terminal, including:
- a first reception module configured to receive configuration information transmitted from a network device, to obtain a configuration parameter of a Grant-Free (GF) Physical Uplink Shared Channel (PUSCH);
- a transmission module configured to perform PUSCH transmission in accordance with the configuration parameter, wherein the configuration parameter is configured based on an existence of A bits of first Uplink Control information (UCI) to be transmitted on the PUSCH, and the A represents a predetermined quantity of bits; or determine a PUSCH transmission resource in accordance with the configuration parameter and whether there is the first UCI to be transmitted on the PUSCH, and perform PUSCH transmission on the determined PUSCH transmission resource.

In still yet another aspect, the present disclosure provides in some embodiments a network device, including:
- a first transmission module configured to transmit configuration information to a terminal, wherein the configuration information carries a configuration parameter of a Grant-Free (GF) Physical Uplink Shared Channel (PUSCH);
- a second reception module configured to receive PUSCH in accordance with the configuration parameter, wherein the configuration parameter is configured based on an existence of A bits of first Uplink Control information (UCI) to be transmitted on the PUSCH, and the A represents a predetermined quantity of bits; or determine a PUSCH transmission resource in accordance with the configuration parameter and whether there is the first UCI to be transmitted on the PUSCH, and receive PUSCH on the determined PUSCH transmission resource.

The present disclosure has the following beneficial effects.

According to the embodiments of the present disclosure, the PUSCH transmission is performed in accordance with the configuration parameter, and the configuration parameter is configured when there is the first UCI having A bits to be transmitted on the PUSCH, and A is a predetermined quantity of bits; or the PUSCH transmission resource is determined in accordance with the configuration parameter and whether there is the first UCI to be transmitted on the PUSCH, and the PUSCH transmission is performed on the determined PUSCH transmission resource. As a result, it is able to ensure the transmission performance of the GF PUSCH carrying the first UCI, thereby to ensure the transmission reliability.

DETAILED DESCRIPTION

Figure 1:
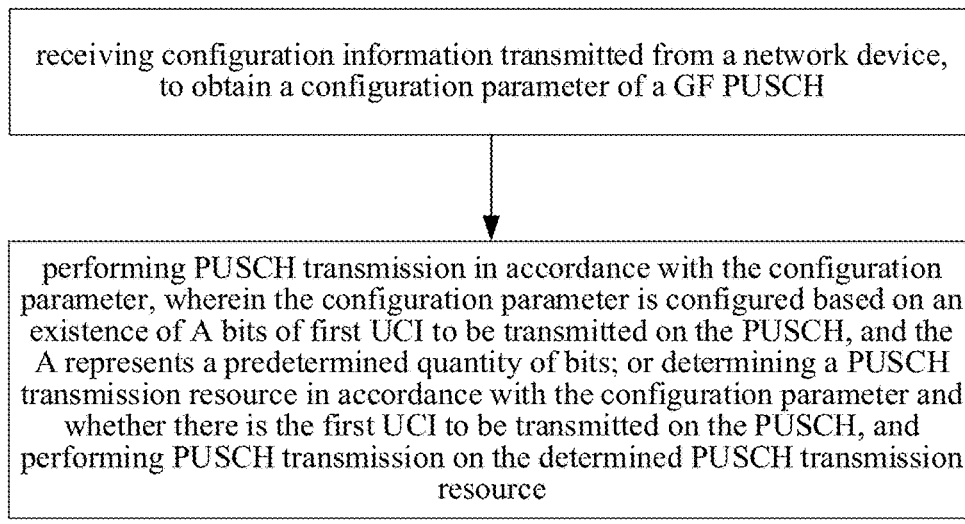
FIG. 1 is a flow chart of a transmission method according to an embodiment of the present disclosure.

In order to make the objects, the technical solutions and the advantages of the present disclosure more apparent, the present disclosure will be described hereinafter in in details in conjunction with the drawings and embodiments.

Firstly, some concepts involved in the embodiments of the present disclosure will be described hereinafter.

Along with the change in the demands on mobile communication services, many organizations, e.g., International Telecommunication Union (ITU), have started to study a new radio communication system (i.e., $5^{th}$ Generation New Radio Access Technologies (5G NR)). In the 5G NR, the simultaneous transmission of a PUCCH and a PUSCH is not supported. When PUCCH overlaps the PUSCH, UCI carried in the PUCCH is transferred to be transmitted on the PUSCH.

Currently, merely an HARQ-ACK (including HARQ-ACK/NACK) and CSI are supported to be transmitted on the PUSCH. If there is an SR in the UCI and the PUSCH does not carry any data (i.e., UL-SCH), the PUSCH is discarded; otherwise, the SR is discarded.

A scheme for the transmission of the HARQ-ACK on the PUSCH is related to the quantity of bits. When the HARQ-ACK has no more than two bits, it is transmitted in a punching manner. In other words, the data on the PUSCH is transmitted in a mode where no resource is occupied by the HARQ-ACK, and the HARQ-ACK is transmitted through punching data information at a mapping position. A data rate is not adversely affected by the transmission of the HARQ-ACK on the PUSCH, but it is equivalent to that the HARQ-ACK is transmitted through covering a part of the data information, so the data transmission performance is adversely affected to some extent. When the HARQ-ACK has more than two bits, it is transmitted in a rate matching mode. In other words, a size of a resource occupied by the HARQ-ACK on the PUSCH is calculated in accordance with such information as a resource offset parameter (beta-offset). Then, encoding, rate matching and mapping are performed on the HARQ-ACK in accordance with the size of the occupied resource, and encoding, rate matching and mapping are performed on the data on resources of the PUSCH other than that occupied by the HARQ-ACK, i.e., the HARQ-ACK and the data are transmitted on different resources of the PUSCH. The data rate is adversely affected due to the existence of the HARQ-ACK, so the data transmission performance is adversely affected too.

The CSI is transmitted on the PUSCH in a rate matching manner, which is similar to the HARQ-ACK having more than two bits.

When the PUSCH overlaps the PUCCH, the performance of the PUSCH transmission is adversely affected because the UCI is transferred to be transmitted on the PUSCH. Currently, there is no definite method for ensuring the performance of the PUSCH transmission when the PUCCH transmission overlaps the PUSCH transmission.

When the transmission of the HARQ-ACK overlaps the transmission of the GF PUSCH, in an existing transmission processing mode, the performance of the PUSCH transmission is adversely affected, so it is impossible to ensure the transmission reliability. In this regard, an object of the present disclosure is to provide a transmission method, a reception method, a terminal and a network device so as to solve the above problem.

As shown in FIG. 1, the present disclosure provides in some embodiments a transmission method for a terminal, which includes Steps 11 and 12.

Step 11: receiving configuration information transmitted from a network device, to obtain a configuration parameter of a GF PUSCH;

it should be appreciated that, the configuration information may be transmitted by the network device to the terminal through Radio Resource Control (RRC) signaling or DCI.

Step 12: performing PUSCH transmission in accordance with the configuration parameter, wherein the configuration parameter is configured based on an existence of A bits of first UCI to be transmitted on the PUSCH, and the A represents a predetermined quantity of bits; or determining a PUSCH transmission resource in accordance with the configuration parameter and whether there is the first UCI to be transmitted on the PUSCH, and performing PUSCH transmission on the determined PUSCH transmission resource.

Various implementations of Step 12 will be specifically described hereinafter.

1. Step 12 specifically includes performing PUSCH transmission in accordance with the configuration parameter, wherein the configuration parameter is configured based on an existence of A bits of first UCI to be transmitted on the PUSCH, and the A represents a predetermined quantity of bits.

To be specific, in this case, Step 12 includes:

when the first UCI does not need to be transmitted on the PUSCH, determining the PUSCH transmission resource in accordance with the configuration parameter, and performing the PUSCH transmission on the determined PUSCH transmission resource; or when the first UCI needs to be transmitted on the PUSCH, determining the PUSCH transmission resource in accordance with the configuration parameter, and performing the PUSCH transmission on the determined PUSCH transmission resource, wherein the PUSCH carries the first UCI.

It should be appreciated that, the configuration parameter of the PUSCH is configured by the network device when there is the first UCI having A bits transmitted on the PUSCH. When the PUSCH transmission resource is being determined by the terminal and A is greater than 2, the HARQ-ACK having more than two bits is transmitted on the PUSCH in a rate matching manner, so a transmission resource for the first UCI having A bits is always reserved in the PUSCH transmission resources, i.e., no matter whether there is the first UCI, the rate matching needs to be performed on the data transmission on the PUSCH on the basis of such a hypothesis that there is the first UCI having A bits. Except the resource occupied by the first UCI, the encoding, the data rating and the mapping are performed on the data in accordance with the remaining resources. In other words, when the first UCI needs to be transmitted on the PUSCH, due to the reserved transmission bits for the first UCI, the first UCI does not occupy the transmission resources on the PUSCH which have been allocated for the data, so the data transmission performance on the PUSCH is not adversely affected. It should be appreciated that, in order to prevent a data rate on the PUSCH when there is the first UCI from being different from that when there is no first UCI, no matter whether there is the first UCI, the rate matching needs to be performed on the data on the PUSCH and the data needs to be transmitted on the basis of such a hypothesis that there is the first UCI having A bits. It should be further appreciated that, in this case, when the first UCI needs to be transmitted on the PUSCH, an actual quantity of bits of the first UCI shall not be greater than A, and if it is greater than A, it is impossible for the transmission performance of the first UCI to achieve a desired effect. In one mode, erroneous scheduling is determined, and in another mode, the first UCI is transmitted through conventional steps. However, at this time, the resources allocated for the first UCI merely meet the requirement on the transmission of at most A bits, and a code rate of the first UCI having more than A bits is greater than an expected code rate, so the transmission performance of the first UCI will be deteriorated. When A is not greater than 2, the HARQ-ACK having not more than two bits is transmitted on the PUSCH in a data punching manner, so no matter whether there is the first UCI, the data on the PUSCH is always transmitted in accordance with a size of all the configured PUSCH resources (encoding, rate matching, mapping, etc.). In other words, the code rate and a mapping resource of the PUSCH are not adversely affected no matter whether there is the first UCI. When there is no first UCI, the data is transmitted normally on all the resources, and when there is the first UCI, the first UCI is transmitted through punching data at corresponding positions in accordance with the desired resources, and the data transmission performance on the PUSCH is probably deteriorated due to the punched data. In order to prevent the data transmission performance from being deteriorated, it is considered to always configure all the PUSCH resources on the basis of such a hypothesis that these resources are punched by the first UCI, so as to achieve the desired data transmission performance on the PUSCH even when there is the first UCI transmitted in a punching manner. At this time, when there is no first UCI transmitted in a punching manner, it is able to achieve better data transmission performance on the PUSCH than a desired transmission performance. In a word, through an appropriate resource configuration, it is able to achieve the desired performance even in the worst case.

It should be further appreciated that, A is an integer greater than or equal to 1. For example, A is 1 or 2. It should be noted that, A may be alternatively a value greater than 2, e.g., 4, through agreement. A scheme of transmitting the first UCI on the PUSCH when the first UCI is the HARQ-ACK is affected by whether A is greater than 2. When A is not greater than 2, it is always assumed that the first UCI is transmitted on the PUSCH in a punching manner, and the rate matching and mapping of the data transmission on the PUSCH is not affected by whether there is the first UCI. When A is greater than 2, it is always assumed that the first UCI is transmitted on the PUSCH in a rate matching manner. When the PUSCH transmission is performed on the resource determined in accordance with the configuration parameter, the rate matching and mapping need to be performed on the data on the PUSCH in accordance with the resources other than the resource occupied by the first UCI having A bits, no matter whether there is the first UCI.

It should be further appreciated that, when the first UCI needs to be transmitted on the PUSCH, a PUCCH carrying the first UCI overlaps the PUSCH and a predetermined time condition has been met. For example, a time interval between a first symbol in an earlier one of the PUCCH and the PUSCH and a last symbol in DCI corresponding to the PUCCH or the PUSCH is not smaller than T1, and a time interface between the first symbol in the earlier one of the PUCCH and the PUSCH and a last symbol in a PDSCH corresponding to the PUCCH is not smaller than T2, as indicated in TS 38.213.

2. Step 12 specifically includes determining a PUSCH transmission resource in accordance with the configuration parameter and whether there is the first UCI to be transmitted on the PUSCH, and performing PUSCH transmission on the determined PUSCH transmission resource.

In a possible embodiment of the present disclosure, in this case, when the configuration parameter includes at least two PUSCH resources, Step 12 includes:

when the first UCI does not need to be transmitted on the PUSCH, performing the PUSCH transmission on a first PUSCH resource in the at least two PUSCH resources;

when the first UCI needs to be transmitted on the PUSCH, performing the PUSCH transmission on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource.

It should be appreciated that, in this case, at least two PUSCH resources are configured. When the first UCI does not need to be transmitted on the PUSCH, one PUSCH resource is used, and when the first UCI needs to be transmitted on the PUSCH, another PUSCH resource is used. For example, two PUSCH resources, i.e., a PUSCH resource 1 and a PUSCH resource 2, have been configured by the network device, and a size of the PUSCH resource 1 (i.e., a quantity of bits capable of being carried by the PUSCH resource 1 or a total quantity of Resource Elements (REs) for carrying the UCI and the data in the PUSCH resource 1) is smaller than a size of the PUSCH resource 2. When the first UCI does not need to be transmitted on the PUSCH, the PUSCH transmission is performed on the PUSCH resource 1, and when the first UCI needs to be transmitted on the PUSCH, the PUSCH transmission is performed on the PUSCH resource 2.

It should be further appreciated that, when the second PUSCH resource includes more than one PUSCH resource, different PUSCH resources in the second PUSCH resource are used to transmit the first UCIs having different quantities of bits, wherein sizes of different PUSCH resources in the second PUSCH resource are different.

For example, three PUSCH resources, i.e., a PUSCH resource 1, a PUSCH resource 2 and a PUSCH resource 3, have been configured by the network device. When the first UCI does not need to be transmitted on the PUSCH, the PUSCH transmission is performed on the PUSCH resource 1. When the first UCI needs to be transmitted on the PUSCH and the quantity of bits of the first UCI does not exceed N, the PUSCH transmission is performed on the PUSCH resource 2. When the quantity of bits of the first UCI is greater than N, the PUSCH transmission is performed on the PUSCH resource 3. For the sizes of the PUSCH resources (i.e., a quantity of bits capable of being carried by the PUSCH resource or a total quantity of REs for carrying the UCI and the data in the PUSCH resource), the size of the PUSCH resource 1>the size of the PUSCH resource 2>the size of the PUSCH resource 3.

In another possible embodiment of the present disclosure, in this case, Step 12 includes:

when the first UCI does not need to be transmitted on the PUSCH, determining the PUSCH transmission resource in accordance with the configuration parameter, and performing the PUSCH transmission on the determined PUSCH transmission resource;

when the first UCI needs to be transmitted on the PUSCH, determining the PUSCH transmission resource in accordance with the configuration parameter, determining a target PUSCH transmission resource in accordance with the determined PUSCH transmission resource and an additional resource, and performing the PUSCH transmission on the target PUSCH transmission resource, wherein the PUSCH carries the first UCI.

It should be appreciated that, in this case, one PUSCH transmission resource has been configured. When the first UCI does not need to be transmitted on the PUSCH, the PUSCH transmission merely needs to be performed in accordance with the configured PUSCH transmission resource. When the first UCI needs to be transmitted on the PUSCH, the configured PUSCH transmission resource is not used directly, and instead, the PUSCH transmission resource is expanded, e.g., combined with the additional resource, to obtain a new PUSCH transmission for the transmission of the PUSCH.

It should be appreciated that, a size of the additional resource is (A1) pre-defined in a protocol, (A12) configured through signaling (e.g., configured by the network device through RRC signaling or DCI), or (A13) determined in accordance with a requirement on the transmission of the first UCI. The mode A13 is determined by the terminal by itself in accordance with the requirement on the transmission of the first UCI. For example, the size of the corresponding transmission resource is calculated in accordance with the quantity of bits of the first UCI and a target code rate.

To be specific, the additional resource includes X1 OFDM symbols and/or X2 RBs, where X1 represents a predetermined quantity of OFDM symbols, e.g., 4, and X2 represents a predetermined quantity of RBs, e.g., 2.

Further, when the additional resource includes X1 OFDM symbols, the determining the target PUSCH transmission resource in accordance with the determined PUSCH transmission resource and the additional resource includes one of the following modes:

a first mode of adding X1 OFDM symbols before a first OFDM symbol of the determined PUSCH transmission resource to obtain the target PUSCH transmission resource;

a second mode of adding X1 OFDM symbols after a last OFDM symbol of the determined PUSCH transmission resource to obtain the target PUSCH transmission resource;

a third mode of adding X11 OFDM symbols before the first OFDM symbol of the determined PUSCH transmission resource and adding X12 OFDM symbols after the last OFDM symbol of the determined PUSCH transmission resource to obtain the target PUSCH transmission resource, where X11+X12=X1.

To be specific, when the additional resource includes X2 RBs, the determining the target PUSCH transmission resource in accordance with the determined PUSCH transmission resource and the additional resource includes one of the following modes:

a first mode of adding X2 RBs before a first RB of the determined PUSCH transmission resource to obtain the target PUSCH transmission resource;

a second mode of adding X2 RBs after a last RB of the determined PUSCH transmission resource to obtain the target PUSCH transmission resource;

a third mode of adding X21 RBs before the first RB of the determined PUSCH transmission resource and adding X22 RBs after the last RB of the determined PUSCH transmission resource to obtain the target PUSCH transmission resource, where X21+X22=X2.

It should be further appreciated that, the first UCI and the PUSCH satisfy at least one of the following conditions.

First condition: the first UCI is at least one of an HARQ-ACK or CSI, and the PUSCH corresponds to a first type of service or a second type of service.

It should be appreciated that, the first type of service is at least one of the followings.

(B11) A service having a high priority level or a high significance level.

It should be appreciated that, the first type of service is a service having a relatively high priority level, or a service having a relatively high significance level.

(B12) A URLLC service.

It should be appreciated that, the second type of service is at least one of the followings.

(B21) A service having a low priority level or a low significance level.

It should be appreciated that, the second type of service is a service having a relatively low priority level, or a service having a relatively low significance level.

(B22) An eMBB service.

(B22) A non-URLLC service.

Here, it should be appreciated that, the second type of service is also a non-URLLC service other than the eMBB service.

It should be further appreciated that, the priority level, the significance level or the type of service is determined in accordance with at least one of a DCI format, a DCI size, an RNTI, a search space, a Control Resource Set (CORESET), a beam, a BLER, a CQI table, an MCS table, a priority level identifier, a PUCCH resource or an SR configuration index number.

It should be appreciated that, which one of the first UCI and the PUSCH is more important is determined in accordance with at least one of the above information. When the first UCI has a higher priority level than, or a same priority level as, the PUSCH, the operation is performed in accordance with the above rule; otherwise, the first UCI is directly discarded.

For example, a service corresponding to a first type of related information, e.g., a first type of DCI format, a first type of DCI size, a first type of RNTI, a first type of search space, a first type of CORESET, a first type of beam, a first type of BLER (e.g., 10-5 or 10-6), a first type of CQI table (e.g., a URLLC CQI table), a first type of MCS table (e.g., a URLLC MCS table), a first type of priority identifier, a first type of PUCCH resource (e.g., a resource with a small index number or a specific index number or a resource corresponding to a specific SR configuration index number), or a first type of SR configuration index number (e.g., an SR configuration with a smaller index number is considered to correspond to URLLC in the case that a plurality of SR configurations has been configured) is the first type of service. A service corresponding to a second type of related information, e.g., a second type of DCI format, a second type of DCI size, a second type of RNTI, a second type of search space, a second type of CORESET, a second type of beam, a second type of BLER (e.g., 10-2 or 10-1), a second type of CQI table (e.g., a 64 Quadrature Amplitude Modulation (QAM) or 256 QAM CQI table), a second type of MCS table, a second type of priority identifier, a second type of PUCCH resource (e.g., a resource with a large index number or a specific index number or a resource corresponding to a specific SR configuration index number), or a second type of SR configuration index number (e.g., an SR configuration with a larger index number is considered to correspond to eMBB or non-URLLC in the case that a plurality of SR configurations has been configured) is the second type of service. A corresponding service type is obtained in accordance with the related information corresponding to the first UCI and the PUSCH.

For another example, when it is specified in advance that the first type of related information has a higher priority level or significance level than the second type of related information, a comparison result between the priority level or the significance comparison result of the first UCI and that of the PUSCH is obtained in accordance with the related information corresponding to the first UCI and the PUSCH.

Second condition: the first UCI is at least one of an HARQ-ACK corresponding to the first type of service or CSI corresponding to the first type of service, and the PUSCH corresponds to the first type of service.

Third condition: the first UCI is at least one of an HARQ-ACK corresponding to a second type of service or CSI corresponding to the second type of service, and the PUSCH corresponds to the first type of service or the second type of service.

Based on a transmission mode of the terminal, the network device receives the information in a same mode.

The applications of the method in the embodiments of the present disclosure will be illustratively described hereinafter on the basis of the terminal and a base station.

First Circumstance

It is presumed that A=2. A GF PUSCH resource is always configured on the basis of a size of a resource for transmitting HARQ-ACK having two bits on the PUSCH. When T1 REs are required for transmitting the HARQ-ACK having two bits in accordance with the requirement on the transmission performance, and T2 REs are required for performing PUSCH transmission in accordance with a Transport Block Size (TBS), the other transmission parameter (e.g., MCS, code rate) and the requirement on the transmission performance (e.g., whether the BLER is 10-2 or 10-4), the PUSCH resource is always configured in accordance with T1+T2 REs. It should be noted that, the PUSCH resource may alternatively be configured in accordance with REs whose quantity is greater than T2 and smaller than T1+T2. This is because, the HARQ-ACK having less than two bits is transmitted in a punching manner, and the data rate is not adversely affected. However, due to the punching, some information in the data is probably lost. When the punched information is just redundant data encoding information, the performance is not adversely affected to a great extent. Hence, it is unnecessary to assume that a data resource occupied by the HARQ-ACK always needs to be completely compensated. The base station obtains a size of each of a time-domain resource and a frequency-domain resource of the PUSCH in accordance with the total quantity of REs determined on the basis of the above principle, and configures the transmission resource for the terminal in accordance with the sizes. When the PUSCH transmission is performed by the terminal in accordance with the transmission resource, it is able to ensure the transmission performance of the data on the PUSCH no matter whether there is the HARQ-ACK to be transmitted. The transmission is performed at a terminal side and a base station side in accordance with a transmission process in an existing mechanism. In other words, when the HARQ-ACK needs to be transmitted on the PUSCH, the HARQ-ACK and the data are transmitted on the PUSCH in a multiplexed manner, and when the HARQ-ACK does not need to be transmitted on the PUSCH, merely the data is transmitted. In the above two transmission cases, the same PUSCH resource is adopted.

It should be appreciated that, a behavior performed at the base station side is the same as that at the terminal side, and the PUSCH is received at the base station side on the corresponding PUSCH resource.

In the first circumstance, the configuration parameter of the GF PUSCH is configured always on the basis of the size of the resource for transmitting first UCI having A bits on the GF PUSCH, so as to ensure the performance of the PUSCH transmission, thereby to ensure the transmission reliability.

Second Circumstance

When configuring the GF PUSCH resources, two PUSCH resources, i.e., a PUSCH resource 1 and a PUSCH resource 2, are configured, and a bearing capacity of the PUSCH resource 1 is smaller than that of the PUSCH resource 2. For example, the PUSCH resource 1 occupies four symbols and four RBs, and the PUSCH resource 2 occupies six symbols and four RBs, or four symbols and eight RBs, or five symbols and seven RBs, i.e., the quantity of symbols or RBs, or both, occupied by the PUSCH resource 1 is different from that occupied by the PUSCH resource 2. In addition, the symbols occupied by the PUSCH resource 2 include, or are totally different from, those occupied by the PUSCH resource 1. For example, when the four symbols occupied by the PUSCH resource 1 include first to fourth symbols within one slot, and the PUSCH resource 2 also include four symbols, e.g., first to fourth, or fifth to eighth or second to fifth symbols. The RBs are configured in a same manner.

At the terminal side, when it determines that no HARQ-ACK needs to be transmitted on the PUSCH (e.g., there is no HARQ-ACK transmission or the PUSCH carrying the HARQ-ACK does not overlap the PUSCH resource), the PUSCH transmission is performed on the PUSCH resource 1, and the PUSCH carries the data (It should be noted that, when Aperiodic CSI (A-CSI) is triggered, the PUSCH further carries the A-CSI). When it determines that the HARQ-ACK needs to be transmitted on the PUSCH (e.g., the PUCCH carrying the HARQ-ACK overlaps the PUSCH resource and the time condition has been met), the PUSCH transmission is performed on the PUSCH resource 2, and the PUSCH carries the HARQ-ACK. Whether the HARQ-ACK is transmitted through punching or rate matching is determined in accordance with the quantity of bits of the HARQ-ACK.

It should be appreciated that, a behavior performed at the base station side is the same as that at the terminal side, and the PUSCH is received at the base station side on the corresponding PUSCH resource.

Third Circumstance

It is presumed that the configured GF PUSCH resource includes four symbols, i.e., eighth to eleventh symbols, within a slot n in a time domain, and include four RBs, i.e., fifth to eighth RBs, in one Bandwidth Part (BWP) in a frequency domain.

At the terminal side, when it determines that no HARQ-ACK needs to be transmitted on the PUSCH (e.g., there is no HARQ-ACK transmission, or the PUCCH carrying the HARQ-ACK does not overlap the PUSCH resource), the PUSCH transmission is performed in accordance with the configuration resource, and the PUSCH carries data (it should be noted that, when A-CSI is triggered simultaneously, the PUSCH further carries the A-CSI). When it determines that the HARQ-ACK needs to be transmitted on the PUSCH (e.g., the PUCCH carrying the HARQ-ACK overlaps the PUSCH resource and the time condition has been met), the configured resource is expended by X1 symbols and/or X2 RBs to obtain a larger resource, the PUSCH transmission is performed on the larger resource, and the PUSCH carries the HARQ-ACK. Whether the HARQ-ACK is transmitted through punching or rate matching is determined in accordance with the quantity of bits of the HARQ-ACK.

1. When merely the time-domain resource is expanded, a value of X1 is pre-defined, or configured through signaling, or calculated as two symbols in accordance with the requirement on the transmission of the HARQ-ACK, i.e., the resource for transmitting the HARQ-ACK. For example, when 96 REs are required in accordance with the quantity of bits of the HARQ-ACK and the target code rate, the PUSCH occupies four RBs in the frequency domain, so two symbols are added in the time domain (each symbol corresponds to four RBs configured originally) to obtain additional 96 REs (one RB includes 12 REs). At this time, the two symbols are added before the four symbols originally occupied by the PUSCH in accordance with the pre-agreement or configuration, i.e., the new PUSCH resource occupies six symbols (sixth to eleventh symbols) within the slot n. Alternatively, the two symbols are added after the four symbols originally occupied by the PUSCH, i.e., the new PUSCH resource occupies six symbols (eighth to thirteenth symbols) within the slot n.

2. When merely the frequency-domain resource is expanded, a value of X2 is pre-defined, or configured through signaling, or calculated as two RBs in accordance with the requirement on the transmission of the HARQ-ACK, i.e., the resource for transmitting the HARQ-ACK. For example, when 96 REs are required in accordance with the quantity of bits of the HARQ-ACK and the target code rate, the PUSCH occupies four symbols in the time domain, so two RBs are added in the frequency domain (each RBs corresponds to four symbols configured originally) to obtain additional 96 REs. At this time, the two RBs are added before the four RBs originally occupied by the PUSCH in accordance with the pre-agreement or configuration, i.e., the new PUSCH resource occupies six RBs (third to eighth RBs) within the BWP. Alternatively, the two RBs are added after the four RBs originally occupied by the PUSCH, i.e., the new PUSCH resource occupies six RBs (fifth to tenth RBs) within the BWP.

3. When both the time-domain resource and the frequency-domain resource are expanded, a value of X1 is pre-defined, or configured through signaling, or calculated as one symbol in accordance with the requirement on the transmission of the HARQ-ACK, i.e., the resource for transmitting the HARQ-ACK, and a value of X2 is pre-defined, or configured through signaling, or calculated as one RB in accordance with the requirement on the transmission of the HARQ-ACK, i.e., the resource for transmitting the HARQ-ACK. For example, when 96 REs are required in accordance with the quantity of bits of the HARQ-ACK and the target code rate, the PUSCH occupies four symbols in the time domain and four RBs in the frequency domain, so one symbol is added in the time domain and one RB is added in the frequency domain to obtain additional 96 REs. At this time, the one symbol is added before the four symbols originally occupied by the PUSCH and the one RB is added before the four RBs originally occupied by the PUSCH in accordance with the pre-agreement or configuration, i.e., the new PUSCH resource occupies five symbols (seventh to eleventh symbols) within the slot n and five RBs (fourth to eighth RBs) within the BWP. Alternatively, the one symbol is added before the four symbols originally occupied by the PUSCH and the one RB is added after the four RBs originally occupied by the PUSCH in accordance with the pre-agreement or configuration, i.e., the new PUSCH resource occupies five symbols (seventh to eleventh symbols) within the slot n and five RBs (fifth to ninth RBs) within the BWP. Alternatively, the one symbol is added after the four symbols originally occupied by the PUSCH and the one RB is added before the four RBs originally occupied by the PUSCH in accordance with the pre-agreement or configuration, i.e., the new PUSCH resource occupies five symbols (eighth to twelfth symbols) within the slot n and five RBs (fourth to eighth RBs) within the BWP. Alternatively, the one symbol is added after the four symbols originally occupied by the PUSCH and the one RB is added after the four RBs originally occupied by the PUSCH, i.e., the new PUSCH resource occupies five symbols (eighth to twelfth symbols) within the slot n and five RBs (fifth to ninth RBs) within the BWP.

It should be appreciated that, a behavior performed at the base station side is the same as that at the terminal side, and the PUSCH is received at the base station side on the corresponding PUSCH resource.

Based on the above, when transmitting the GF PUSCH, an appropriate matched resource is selected in accordance with whether there is the first UCI to be transmitted on the PUSCH, or whether the configured GF resource is expanded to use the GF resource appropriately. As a result, it is able to prevent the transmission performance of the GF PUSCH from being adversely affected by the resource occupied by the UCI, thereby to ensure the transmission reliability.

It should be further appreciated that, the above description has been given merely by taking the HARQ-ACK as an example, and the method is also applicable to the CSI. In the embodiments of the present disclosure, the PUSCH is a URLLC PUSCH, and the HARQ-ACK is an eMBB or URLLC PUSCH. It should be noted that, the method is also applicable when the PUSCH is an eMBB PUSCH.

Figure 2:
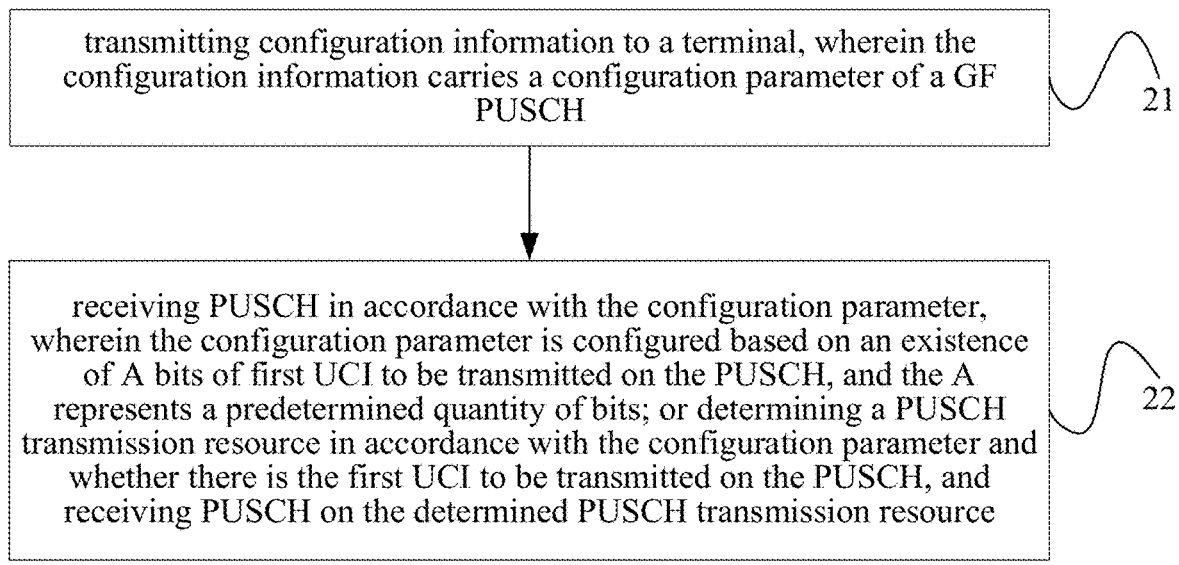
FIG. 2 is a flow chart of a reception method according to an embodiment of the present disclosure.

As shown in FIG. 2, the present disclosure further provides in some embodiments a reception method for a network device, which includes:

Step 21 of transmitting configuration information to a terminal, wherein the configuration information carries a configuration parameter of a GF PUSCH;

Step 22 of receiving PUSCH in accordance with the configuration parameter, wherein the configuration parameter is configured based on an existence of A bits of first UCI to be transmitted on the PUSCH, and the A represents a predetermined quantity of bits; or determining a PUSCH transmission resource in accordance with the configuration parameter and whether there is the first UCI to be transmitted on the PUSCH, and receiving PUSCH on the determined PUSCH transmission resource.

To be specific, the receiving PUSCH in accordance with the configuration parameter comprises:

when the first UCI does not need to be transmitted on the PUSCH, determining the PUSCH transmission resource in accordance with the configuration parameter, and receiving the PUSCH on the determined PUSCH transmission resource; or when the first UCI needs to be transmitted on the PUSCH, determining the PUSCH transmission resource in accordance with the configuration parameter, and receiving the PUSCH on the determined PUSCH transmission resource, wherein the PUSCH carries the first UCI.

In a possible embodiment of the present disclosure, the determining the PUSCH transmission resource in accordance with the configuration parameter and whether there is the first UCI to be transmitted on the PUSCH and receiving the PUSCH on the determined PUSCH transmission resource comprises:

the configuration parameter comprises at least two PUSCH resources;

when the first UCI does not need to be transmitted on the PUSCH, receiving the PUSCH on a first PUSCH resource in the at least two PUSCH resources;

when the first UCI needs to be transmitted on the PUSCH, receiving the PUSCH on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource.

Further, when the second PUSCH resource comprises more than one PUSCH resource, different PUSCH resources in the second PUSCH resource are used to receive the first UCIs having different quantities of bits, wherein sizes of different PUSCH resources in the second PUSCH resource are different.

To be specific, A is an integer greater than or equal to 1.

In a possible embodiment of the present disclosure, the determining the PUSCH transmission resource in accordance with the configuration parameter and whether there is the first UCI to be transmitted on the PUSCH and receiving the PUSCH on the determined PUSCH transmission resource comprises:

when the first UCI does not need to be transmitted on the PUSCH, determining the PUSCH transmission resource in accordance with the configuration parameter, and receiving the PUSCH on the determined PUSCH transmission resource;

when the first UCI needs to be transmitted on the PUSCH, determining the PUSCH transmission resource in accordance with the configuration parameter, determining a target PUSCH transmission resource in accordance with the determined PUSCH transmission resource and an additional resource, and receiving the PUSCH on the target PUSCH transmission resource, wherein the PUSCH carries the first UCI.

Further, determining the target PUSCH transmission resource in accordance with the determined PUSCH transmission resource and the additional resource comprises:

the additional resource comprises X1 OFDM symbols; adding X1 OFDM symbols before a first OFDM symbol of the determined PUSCH transmission resource, to obtain the target PUSCH transmission resource; or adding X1 OFDM symbols after a last OFDM symbol of the determined PUSCH transmission resource, to obtain the target PUSCH transmission resource; or adding X11 OFDM symbols before the first OFDM symbol of the determined PUSCH transmission resource, and adding X12 OFDM symbols after the last OFDM symbol of the determined PUSCH transmission resource, to obtain the target PUSCH transmission resource, where X11+X12=X1.

Further, determining the target PUSCH transmission resource in accordance with the determined PUSCH transmission resource and the additional resource comprises:

the additional resource comprises X2 RBs; adding X2 RBs before a first RB of the determined PUSCH transmission resource, to obtain the target PUSCH transmission resource; or adding X2 RBs after a last RB of the determined PUSCH transmission resource, to obtain the target PUSCH transmission resource; or adding X21 RBs before a first RB of the determined PUSCH transmission resource and adding X22 RBs after a last RB of the determined PUSCH transmission resource, to obtain the target PUSCH transmission resource, where X21+X22=X2.

To be specific, a size of the additional resource is predefined in a protocol, configured through signaling, or determined in accordance with a requirement on the transmission of the first UCI.

Further, the first UCI and the PUSCH satisfy at least one of following conditions:
  a first condition where the first UCI is at least one of a Hybrid Automatic Repeat reQuest Acknowledgement (HARQ-ACK) or Channel State Information (CSI), and the PUSCH corresponds to a first type of service or a second type of service;
  a second condition where the first UCI is at least one of an HARQ-ACK corresponding to the first type of service or CSI corresponding to the first type of service, and the PUSCH corresponds to the first type of service;
  a third condition where the first UCI is at least one of an HARQ-ACK corresponding to a second type of service or CSI corresponding to the second type of service, and the PUSCH corresponds to the first type of service or the second type of service.

To be specific, the first type of service is at least one of a service having a high priority level or a high significance level, or a URLLC service; the second type of service is at least one of a service having a low priority level or a low significance level, an eMBB service, or a non-URLLC service.

To be specific, the priority level, the significance level or the type of service is determined in accordance with at least one of a DCI format, a DCI size, an RNTI, a search space, a control resource set, a beam, a BLER, a CQI table, an MCS table, a priority level identifier, a PUCCH resource or an SR configuration index number.

All description about the network device mentioned hereinabove is also adapted to the reception method for the network device, with a same technical effect.

Figure 3:
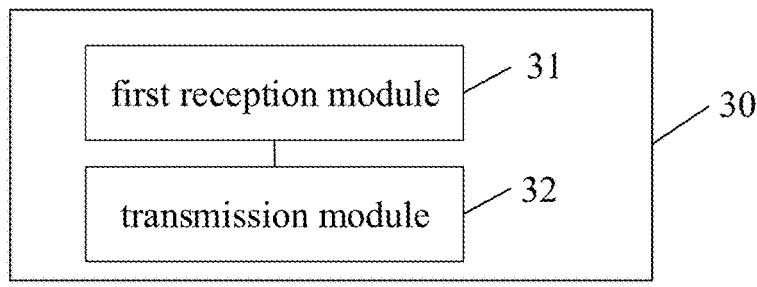
FIG. 3 is a schematic view showing modules of a terminal according to an embodiment of the present disclosure.

As shown in FIG. 3, the present disclosure further provides in some embodiments a terminal 30, which includes:
  a first reception module 31 configured to receive configuration information transmitted from a network device, to obtain a configuration parameter of a GF PUSCH;
  a transmission module 32 configured to perform PUSCH transmission in accordance with the configuration parameter, wherein the configuration parameter is configured based on an existence of A bits of first UCI to be transmitted on the PUSCH, and the A represents a predetermined quantity of bits; or determining a PUSCH transmission resource in accordance with the configuration parameter and whether there is the first UCI to be transmitted on the PUSCH, and performing PUSCH transmission on the determined PUSCH transmission resource.

In a possible embodiment of the present disclosure, when performing PUSCH transmission in accordance with the configuration parameter, the transmission module 32 is further configured to:
  when the first UCI does not need to be transmitted on the PUSCH, determining the PUSCH transmission resource in accordance with the configuration parameter, and perform the PUSCH transmission on the determined PUSCH transmission resource; or
  when the first UCI needs to be transmitted on the PUSCH, determine the PUSCH transmission resource in accordance with the configuration parameter, and perform the PUSCH transmission on the determined PUSCH transmission resource, wherein the PUSCH carries the first UCI.

In a possible embodiment of the present disclosure, when determining the PUSCH transmission resource in accordance with the configuration parameter and whether there is the first UCI to be transmitted on the PUSCH and performing the PUSCH transmission on the determined PUSCH transmission resource, the transmission module 32 is further configured to:
  the configuration parameter comprises at least two PUSCH resources;
  when the first UCI does not need to be transmitted on the PUSCH, perform the PUSCH transmission on a first PUSCH resource in the at least two PUSCH resources;
  when the first UCI needs to be transmitted on the PUSCH, perform the PUSCH transmission on a second PUSCH resource in the at least two PUSCH resources, wherein the PUSCH carries the first UCI,
  wherein the second PUSCH resource is a PUSCH resource in the at least two PUSCH resources other than the first PUSCH resource, and a size of the first PUSCH resource is smaller than a size of the second PUSCH resource.

Further, when the second PUSCH resource comprises more than one PUSCH resource, different PUSCH resources in the second PUSCH resource are used to transmit the first UCIs having different quantities of bits,
  wherein sizes of different PUSCH resources in the second PUSCH resource are different.

To be specific, A is an integer greater than or equal to 1.

In a possible embodiment of the present disclosure, when determining the PUSCH transmission resource in accordance with the configuration parameter and whether there is the first UCI to be transmitted on the PUSCH and performing the PUSCH transmission on the determined PUSCH transmission resource, the transmission module 32 is further configured to:
  when the first UCI does not need to be transmitted on the PUSCH, determine the PUSCH transmission resource in accordance with the configuration parameter, and perform the PUSCH transmission on the determined PUSCH transmission resource;
  when the first UCI needs to be transmitted on the PUSCH, determine the PUSCH transmission resource in accordance with the configuration parameter, determine a target PUSCH transmission resource in accordance with the determined PUSCH transmission resource and an additional resource, and perform the PUSCH transmission on the target PUSCH transmission resource, wherein the PUSCH carries the first UCI.

In a possible embodiment of the present disclosure, determining the target PUSCH transmission resource in accordance with the determined PUSCH transmission resource and the additional resource comprises:
  the additional resource comprises X1 OFDM symbols; adding X1 OFDM symbols before a first OFDM symbol of the determined PUSCH transmission resource, to obtain the target PUSCH transmission resource; or adding X1 OFDM symbols after a last OFDM symbol of the determined PUSCH transmission resource, to obtain the target PUSCH transmission resource; or adding X11 OFDM symbols before the first OFDM symbol of the determined PUSCH transmission resource, and adding X12 OFDM symbols after the last OFDM symbol of the determined PUSCH transmission resource, to obtain the target PUSCH transmission resource, where X11+X12=X1.

Further, determining the target PUSCH transmission resource in accordance with the determined PUSCH transmission resource and the additional resource comprises:

the additional resource comprises X2 RBs; adding X2 RBs before a first RB of the determined PUSCH transmission resource, to obtain the target PUSCH transmission resource; or adding X2 RBs after a last RB of the determined PUSCH transmission resource, to obtain the target PUSCH transmission resource; or adding X21 RBs before a first RB of the determined PUSCH transmission resource and adding X22 RBs after a last RB of the determined PUSCH transmission resource, to obtain the target PUSCH transmission resource, where X21+X22=X2.

In a possible embodiment of the present disclosure, a size of the additional resource is pre-defined in a protocol, configured through signaling, or determined in accordance with a requirement on the transmission of the first UCI.

To be specific, the first UCI and the PUSCH satisfy at least one of following conditions:
a first condition where the first UCI is at least one of a HARQ-ACK or CSI, and the PUSCH corresponds to a first type of service or a second type of service;
a second condition where the first UCI is at least one of an HARQ-ACK corresponding to the first type of service or CSI corresponding to the first type of service, and the PUSCH corresponds to the first type of service;
a third condition where the first UCI is at least one of an HARQ-ACK corresponding to a second type of service or CSI corresponding to the second type of service, and the PUSCH corresponds to the first type of service or the second type of service.

To be specific, the first type of service is at least one of a service having a high priority level or a high significance level, or a URLLC service. The second type of service is at least one of a service having a low priority level or a low significance level, an eMBB service, or a non-URLLC service.

To be specific, the priority level, the significance level or the type of service is determined in accordance with at least one of a DCI format, a DCI size, an RNTI, a search space, a control resource set, a beam, a BLER, a CQI table, an MCS table, a priority level identifier, a PUCCH resource or an SR configuration index number.

It should be appreciated that, the terminal corresponds to the above-mentioned method for the terminal, and the implementation of the method is applicable to the terminal with a same technical effect.

Figure 4:
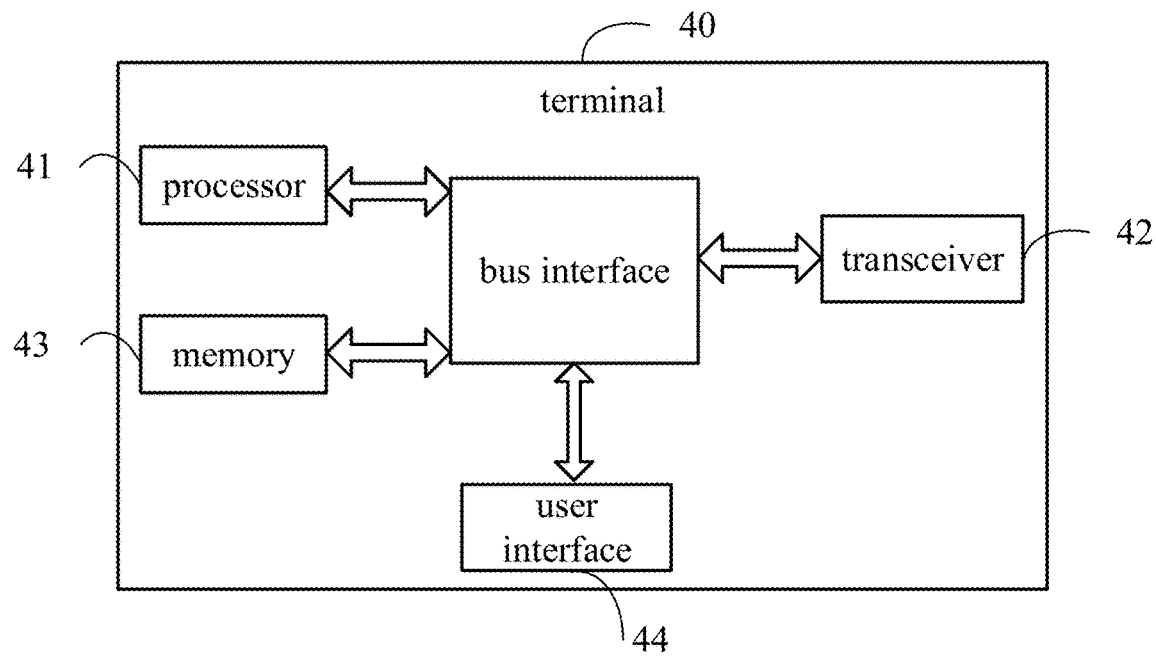
FIG. 4 is a schematic view showing the terminal according to an embodiment of the present disclosure.

As shown in FIG. 4, the present disclosure further provides in some embodiments a terminal 40, which includes a processor 41, a transceiver 42, a memory 43, and a program stored in the memory 43 and executed by the processor 41. The transceiver 42 is coupled to the processor 41 and the memory 43 via a bus interface. The processor 41 is configured to read the program in the memory to:
receive configuration information transmitted from a network device, to obtain a configuration parameter of a GF PUSCH;
perform PUSCH transmission in accordance with the configuration parameter, wherein the configuration parameter is configured based on an existence of A bits of first UCI to be transmitted on the PUSCH, and A represents a predetermined quantity of bits; or determine a PUSCH transmission resource in accordance with the configuration parameter and whether there is the first UCI to be transmitted on the PUSCH, and performing PUSCH transmission on the determined PUSCH transmission resource.

It should be appreciated that, in FIG. 4, bus architecture includes a number of buses and bridges connected to each other, so as to connect various circuits for one or more processors represented by the processor 41 and one or more memories represented by the memory 43. In addition, as is known in the art, the bus architecture may be used to connect any other circuits, such as a circuit for a peripheral device, a circuit for a voltage stabilizer and a power management circuit, which is not further defined herein. The bus interface is provided, and the transceiver 42 consists of a plurality of elements, i.e., a transmitter and a receiver for communication with any other devices over a transmission medium. With respect to different terminals, a user interface 44 is also provided for devices which are to be arranged inside or outside the terminal, and these devices may include but not limited to a keypad, a display, a speaker, a microphone and a joystick. The processor 41 takes charge of managing the bus architecture as well as general processings. The memory 43 stores therein data for the operation of the processor 41.

In a possible embodiment of the present disclosure, when the processor executes the program to perform PUSCH transmission in accordance with the configuration parameter, the processor is configured to execute the program to:
when the first UCI does not need to be transmitted on the PUSCH, determine the PUSCH transmission resource in accordance with the configuration parameter, and perform the PUSCH transmission on the determined PUSCH transmission resource; or
when the first UCI needs to be transmitted on the PUSCH, determine the PUSCH transmission resource in accordance with the configuration parameter, and perform the PUSCH transmission on the determined PUSCH transmission resource, wherein the PUSCH carries the first UCI.

In a possible embodiment of the present disclosure, when the processor executes the program to determine the PUSCH transmission resource in accordance with the configuration parameter and whether there is the first UCI to be transmitted on the PUSCH and perform the PUSCH transmission on the determined PUSCH transmission resource, the processor is configured to execute the program to:
the configuration parameter comprises at least two PUSCH resources;
when the first UCI does not need to be transmitted on the PUSCH, perform the PUSCH transmission on a first PUSCH resource in the at least two PUSCH resources;
when the first UCI needs to be transmitted on the PUSCH, perform the PUSCH transmission on a second PUSCH resource in the at least two PUSCH resources, wherein the PUSCH carries the first UCI,
wherein the second PUSCH resource is a PUSCH resource in the at least two PUSCH resources other than the first PUSCH resource, and a size of the first PUSCH resource is smaller than a size of the second PUSCH resource.

To be specific, when the second PUSCH resource comprises more than one PUSCH resource, different PUSCH resources in the second PUSCH resource are used to transmit the first UCIs having different quantities of bits,
wherein sizes of different PUSCH resources in the second PUSCH resource are different.

To be specific, A is an integer greater than or equal to 1.

In a possible embodiment of the present disclosure, when the processor executes the program to determine the PUSCH transmission resource in accordance with the configuration parameter and whether there is the first UCI to be transmitted on the PUSCH and perform the PUSCH transmission on the determined PUSCH transmission resource, the processor is configured to execute the program to:
  when the first UCI does not need to be transmitted on the PUSCH, determine the PUSCH transmission resource in accordance with the configuration parameter, and perform the PUSCH transmission on the determined PUSCH transmission resource;
  when the first UCI needs to be transmitted on the PUSCH, determine the PUSCH transmission resource in accordance with the configuration parameter, determine a target PUSCH transmission resource in accordance with the determined PUSCH transmission resource and an additional resource, and perform the PUSCH transmission on the target PUSCH transmission resource, wherein the PUSCH carries the first UCI.

In a possible embodiment of the present disclosure, the processor is configured to execute the program to:
  the additional resource comprises X1 OFDM symbols; add X1 OFDM symbols before a first OFDM symbol of the determined PUSCH transmission resource, to obtain the target PUSCH transmission resource; or add X1 OFDM symbols after a last OFDM symbol of the determined PUSCH transmission resource, to obtain the target PUSCH transmission resource; or add X11 OFDM symbols before the first OFDM symbol of the determined PUSCH transmission resource, and add X12 OFDM symbols after the last OFDM symbol of the determined PUSCH transmission resource, to obtain the target PUSCH transmission resource, where X11+X12=X1.

In a possible embodiment of the present disclosure, the processor is configured to execute the program to:
  the additional resource comprises X2 Resource Blocks (RBs); add X2 RBs before a first RB of the determined PUSCH transmission resource, to obtain the target PUSCH transmission resource; or add X2 RBs after a last RB of the determined PUSCH transmission resource, to obtain the target PUSCH transmission resource; or add X21 RBs before a first RB of the determined PUSCH transmission resource and add X22 RBs after a last RB of the determined PUSCH transmission resource, to obtain the target PUSCH transmission resource, where X21+X22=X2.

To be specific, a size of the additional resource is predefined in a protocol, configured through signaling, or determined in accordance with a requirement on the transmission of the first UCI.

To be specific, the first UCI and the PUSCH satisfy at least one of:
  a first condition where the first UCI is at least one of a HARQ-ACK or CSI, and the PUSCH corresponds to a first type of service or a second type of service;
  a second condition where the first UCI is at least one of an HARQ-ACK corresponding to the first type of service or CSI corresponding to the first type of service, and the PUSCH corresponds to the first type of service;
  a third condition where the first UCI is at least one of an HARQ-ACK corresponding to a second type of service or CSI corresponding to the second type of service, and the PUSCH corresponds to the first type of service or the second type of service.

To be specific, the first type of service is at least one of a service having a high priority level or a high significance level, or a URLLC service. The second type of service is at least one of a service having a low priority level or a low significance level, an eMBB service, or a non-URLLC service.

In a possible embodiment of the present disclosure, the priority level, the significance level or the type of service is determined in accordance with at least one of a DCI format, a DCI size, an RNTI, a search space, a control resource set, a beam, a BLER, a CQI table, an MCS table, a priority level identifier, a PUCCH resource or an SR configuration index number.

The present disclosure further provides in some embodiments a computer-readable storage medium storing therein a program. The program is executed by a processor so as to implement steps of the above-mentioned transmission method for the terminal.

Figure 5:
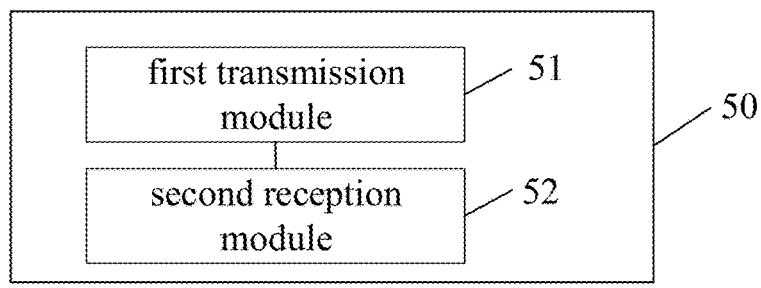
FIG. 5 is a schematic view showing modules of a network device according to an embodiment of the present disclosure.

As shown in FIG. 5, the present disclosure further provides in some embodiments a network device 50, which includes:
  a first transmission module 51 configured to transmit configuration information to a terminal, wherein the configuration information carries a configuration parameter of a GF PUSCH;
  a second reception module 52 configured to receive PUSCH in accordance with the configuration parameter, wherein the configuration parameter is configured based on an existence of A bits of first UCI to be transmitted on the PUSCH, and the A represents a predetermined quantity of bits; or determine a PUSCH transmission resource in accordance with the configuration parameter and whether there is the first UCI to be transmitted on the PUSCH, and receive PUSCH on the determined PUSCH transmission resource.

In a possible embodiment of the present disclosure, when receiving PUSCH in accordance with the configuration parameter, the second reception module 52 is further configured to:
  when the first UCI does not need to be transmitted on the PUSCH, determine the PUSCH transmission resource in accordance with the configuration parameter, and receive the PUSCH on the determined PUSCH transmission resource; or
  when the first UCI needs to be transmitted on the PUSCH, determine the PUSCH transmission resource in accordance with the configuration parameter, and receive the PUSCH on the determined PUSCH transmission resource, wherein the PUSCH carries the first UCI.

In a possible embodiment of the present disclosure, when determining the PUSCH transmission resource in accordance with the configuration parameter and whether there is the first UCI to be transmitted on the PUSCH and receiving the PUSCH on the determined PUSCH transmission resource, the second reception module 52 is further configured to:
  the configuration parameter comprises at least two PUSCH resources;
  when the first UCI does not need to be transmitted on the PUSCH, receive the PUSCH on a first PUSCH resource in the at least two PUSCH resources;
  when the first UCI needs to be transmitted on the PUSCH, receive the PUSCH on a second PUSCH resource in the at least two PUSCH resources, wherein the PUSCH carries the first UCI,
  wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource comprises more than one PUSCH resource, different PUSCH resources in the second PUSCH resource are used to receive the first UCIs having different quantities of bits, wherein sizes of different PUSCH resources in the second PUSCH resource are different.

To be specific, A is an integer greater than or equal to 1.

In a possible embodiment of the present disclosure, when determining the PUSCH transmission resource in accordance with the configuration parameter and whether there is the first UCI to be transmitted on the PUSCH and receiving the PUSCH on the determined PUSCH transmission resource, the second reception module 52 is further configured to:

when the first UCI does not need to be transmitted on the PUSCH, determine the PUSCH transmission resource in accordance with the configuration parameter, and receive the PUSCH on the determined PUSCH transmission resource;

when the first UCI needs to be transmitted on the PUSCH, determine the PUSCH transmission resource in accordance with the configuration parameter, determine a target PUSCH transmission resource in accordance with the determined PUSCH transmission resource and an additional resource, and receive the PUSCH on the target PUSCH transmission resource, wherein the PUSCH carries the first UCI.

In a possible embodiment of the present disclosure, the determining the target PUSCH transmission resource in accordance with the determined PUSCH transmission resource and the additional resource comprises:

the additional resource comprises X1 OFDM symbols; adding X1 OFDM symbols before a first OFDM symbol of the determined PUSCH transmission resource, to obtain the target PUSCH transmission resource; or adding X1 OFDM symbols after a last OFDM symbol of the determined PUSCH transmission resource, to obtain the target PUSCH transmission resource; or adding X11 OFDM symbols before the first OFDM symbol of the determined PUSCH transmission resource, and adding X12 OFDM symbols after the last OFDM symbol of the determined PUSCH transmission resource, to obtain the target PUSCH transmission resource, where X11+X12=X1.

In a possible embodiment of the present disclosure, determining the target PUSCH transmission resource in accordance with the determined PUSCH transmission resource and the additional resource comprises:

the additional resource comprises X2 RBs; adding X2 RBs before a first RB of the determined PUSCH transmission resource, to obtain the target PUSCH transmission resource; or adding X2 RBs after a last RB of the determined PUSCH transmission resource, to obtain the target PUSCH transmission resource; or adding X21 RBs before a first RB of the determined PUSCH transmission resource and adding X22 RBs after a last RB of the determined PUSCH transmission resource, to obtain the target PUSCH transmission resource, where X21+X22=X2.

To be specific, a size of the additional resource is predefined in a protocol, configured through signaling, or determined in accordance with a requirement on the transmission of the first UCI.

To be specific, the first UCI and the PUSCH satisfy at least one of following conditions:

a first condition where the first UCI is at least one of a HARQ-ACK or CSI, and the PUSCH corresponds to a first type of service or a second type of service;

a second condition where the first UCI is at least one of an HARQ-ACK corresponding to the first type of service or CSI corresponding to the first type of service, and the PUSCH corresponds to the first type of service;

a third condition where the first UCI is at least one of an HARQ-ACK corresponding to a second type of service or CSI corresponding to the second type of service, and the PUSCH corresponds to the first type of service or the second type of service.

To be specific, the first type of service is at least one of a service having a high priority level or a high significance level, or a URLLC service. The second type of service is at least one of a service having a low priority level or a low significance level, an eMBB service, or a non-URLLC service.

In a possible embodiment of the present disclosure, the priority level, the significance level or the type of service is determined in accordance with at least one of a DCI format, a DCI size, an RNTI, a search space, a control resource set, a beam, a BLER, a CQI table, an MCS table, a priority level identifier, a PUCCH resource or an SR configuration index number.

It should be appreciated that, the network device corresponds to the above-mentioned method for the network device, and the implementation of the method is applicable to the network device with a same technical effect.

Figure 6:
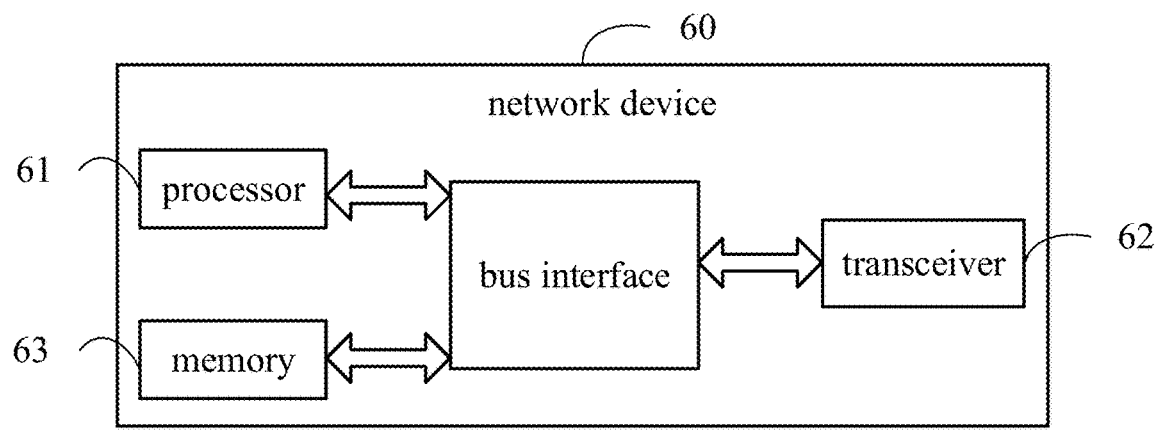
FIG. 6 is a schematic view showing the network device according to an embodiment of the present disclosure.

As shown in FIG. 6, the present disclosure further provides in some embodiments a network device 60, which includes a processor 61, a transceiver 62, a memory 63, and a program stored in the memory 63 and executed by the processor 61. The transceiver 62 is coupled to the processor 61 and the memory 63 via a bus interface. The processor 61 is configured to read the program in the memory, so as to:

transmit configuration information to a terminal, wherein the configuration information carries a configuration parameter of a GF PUSCH;

receive PUSCH in accordance with the configuration parameter, wherein the configuration parameter is configured based on an existence of A bits of first UCI to be transmitted on the PUSCH, and the A represents a predetermined quantity of bits; or determine a PUSCH transmission resource in accordance with the configuration parameter and whether there is the first UCI to be transmitted on the PUSCH, and receive PUSCH on the determined PUSCH transmission resource.

It should be appreciated that, in FIG. 6, bus architecture includes a number of buses and bridges connected to each other, so as to connect various circuits for one or more processors represented by the processor 61 and one or more memories represented by the memory 63. In addition, as is known in the art, the bus architecture may be used to connect any other circuits, such as a circuit for a peripheral device, a circuit for a voltage stabilizer and a power management circuit, which are not further defined herein. The bus interface is provided, and the transceiver 62 consists of a plurality of elements, i.e., a transmitter and a receiver for communication with any other devices over a transmission medium. For different terminals, the processor 61 takes charge of managing the bus architecture as well as general processings. The memory 63 stores therein data for the operation of the processor 61.

In a possible embodiment of the present disclosure, wherein when the processor executes the program to receive PUSCH in accordance with the configuration parameter, the processor is configured to execute the program to:
- when the first UCI does not need to be transmitted on the PUSCH, determine the PUSCH transmission resource in accordance with the configuration parameter, and receive the PUSCH on the determined PUSCH transmission resource; or
- when the first UCI needs to be transmitted on the PUSCH, determine the PUSCH transmission resource in accordance with the configuration parameter, and receive the PUSCH on the determined PUSCH transmission resource, wherein the PUSCH carries the first UCI.

In a possible embodiment of the present disclosure, when the processor executes the program to determine the PUSCH transmission resource in accordance with the configuration parameter and whether there is the first UCI to be transmitted on the PUSCH, and receive the PUSCH on the determined PUSCH transmission resource, the processor is configured to execute the program to:
- the configuration parameter comprises at least two PUSCH resources;
- when the first UCI does not need to be transmitted on the PUSCH, receive the PUSCH on a first PUSCH resource in the at least two PUSCH resources;
- when the first UCI needs to be transmitted on the PUSCH, receive the PUSCH on a second PUSCH resource in the at least two PUSCH resources, wherein the PUSCH carries the first UCI,
- wherein the second PUSCH resource is a PUSCH resource in the at least two PUSCH resources other than the first PUSCH resource, and a size of the first PUSCH resource is smaller than a size of the second PUSCH resource.

In a possible embodiment of the present disclosure, when the second PUSCH resource comprises more than one PUSCH resource, different PUSCH resources in the second PUSCH resource are used to receive the first UCIs having different quantities of bits,
wherein sizes of different PUSCH resources in the second PUSCH resource are different.

To be specific, A is an integer greater than or equal to 1.

In a possible embodiment of the present disclosure, the processor executes the program to determine the PUSCH transmission resource in accordance with the configuration parameter and whether there is the first UCI to be transmitted on the PUSCH, and receive the PUSCH on the determined PUSCH transmission resource, the processor is configured to execute the program to:
- when the first UCI does not need to be transmitted on the PUSCH, determine the PUSCH transmission resource in accordance with the configuration parameter, and receive the PUSCH on the determined PUSCH transmission resource;
- when the first UCI needs to be transmitted on the PUSCH, determine the PUSCH transmission resource in accordance with the configuration parameter, determine a target PUSCH transmission resource in accordance with the determined PUSCH transmission resource and an additional resource, and receive the PUSCH on the target PUSCH transmission resource, wherein the PUSCH carries the first UCI.

In a possible embodiment of the present disclosure, the processor is configured to execute the program to:
- the additional resource comprises X1 OFDM symbols; add X1 OFDM symbols before a first OFDM symbol of the determined PUSCH transmission resource, to obtain the target PUSCH transmission resource; or add X1 OFDM symbols after a last OFDM symbol of the determined PUSCH transmission resource, to obtain the target PUSCH transmission resource; or add X11 OFDM symbols before the first OFDM symbol of the determined PUSCH transmission resource, and add X12 OFDM symbols after the last OFDM symbol of the determined PUSCH transmission resource, to obtain the target PUSCH transmission resource, where X11+X12=X1.

In a possible embodiment of the present disclosure, the processor is configured to execute the program to:
- the additional resource comprises X2 RBs; add X2 RBs before a first RB of the determined PUSCH transmission resource, to obtain the target PUSCH transmission resource; or add X2 RBs after a last RB of the determined PUSCH transmission resource, to obtain the target PUSCH transmission resource; or add X21 RBs before a first RB of the determined PUSCH transmission resource and add X22 RBs after a last RB of the determined PUSCH transmission resource, to obtain the target PUSCH transmission resource, where X21+X22=X2.

To be specific, a size of the additional resource is predefined in a protocol, configured through signaling, or determined in accordance with a requirement on the transmission of the first UCI.

To be specific, the first UCI and the PUSCH satisfy at least one of following conditions:
- a first condition where the first UCI is at least one of a HARQ-ACK or CSI, and the PUSCH corresponds to a first type of service or a second type of service;
- a second condition where the first UCI is at least one of an HARQ-ACK corresponding to the first type of service or CSI corresponding to the first type of service, and the PUSCH corresponds to the first type of service;
- a third condition where the first UCI is at least one of an HARQ-ACK corresponding to a second type of service or CSI corresponding to the second type of service, and the PUSCH corresponds to the first type of service or the second type of service.

To be specific, the first type of service is at least one of a service having a high priority level or a high significance level, or a URLLC service. The second type of service is at least one of a service having a low priority level or a low significance level, an eMBB service, or a non-URLLC service.

In a possible embodiment of the present disclosure, the priority level, the significance level or the type of service is determined in accordance with at least one of a DCI format, a DCI size, an RNTI, a search space, a control resource set, a beam, a BLER, a CQI table, an MCS table, a priority level identifier, a PUCCH resource or an SR configuration index number.

The present disclosure further provides in some embodiments a computer-readable storage medium storing therein a computer program. The computer program is executed by a processor so as to implement steps of the above-mentioned reception method for the network device.

The network device is a Base Transceiver Station (BTS) in a Global System of Mobile Communication (GSM) system or a Code Division Multiple Access (CDMA) system, a Node B (NB) in a Wideband Code Division Multiple Access (WCDMA) system, an Evolutional Node B (eNB, or eNodeB) in a Long Term Evolution (LTE) system, a relay or an access point, or a Next Generation Node B (ng-NB), a Central Unit (CU) or a Distributed Unit (DU) in a future 5G network, which will not be particularly defined herein.

It should be appreciated that, the embodiments of the present disclosure are implemented by hardware, software, firmware, middleware, microcode or a combination thereof. For the hardware implementation, the modules, the units, the sub-units, and the sub-modules may be implemented in one or more of an Application Specific Integrated Circuits (ASIC), a Digital Signal Processor (DSP), a DSP device (DSPD), a Programmable Logic Device (PLD), a Field-Programmable Gate Array (FPGA), a general-purpose processor, a controller, a microcontroller, a microprocessor, any other electronic unit capable of achieving the functions in the present disclosure, or a combination thereof.

For the software implementation, the scheme in the embodiments of the present disclosure is implemented through modules capable of achieving the functions in the present disclosure (e.g., processes or functions). Software codes are stored in the memory and executed by the processor. The memory is implemented inside or outside the processor.

The expression "at least one of A or B" in the specification and the appended claims represents that there is only A, there are both A and B, and there is only B.

The above are optional implementations of the present disclosure. It should be noted that for a person skilled in the art, various improvements and modifications can be made without departing from the principles described in the present disclosure, and these improvements and modifications are also within the protection scope of the present disclosure.

What is claimed is:

1. A transmission method for a terminal, comprising:
receiving configuration information transmitted from a network device, to obtain a configuration parameter of a Grant-Free (GF) Physical Uplink Shared Channel (PUSCH);
performing PUSCH transmission in accordance with the configuration parameter, wherein the configuration parameter is configured based on an existence of number A of bits of first Uplink Control information (UCI) to be transmitted on the PUSCH, and the number A represents a predetermined quantity of bits; or determining a PUSCH transmission resource in accordance with the configuration parameter and whether there is the first UCI to be transmitted on the PUSCH, and performing PUSCH transmission on the determined PUSCH transmission resource;
wherein
the performing the PUSCH transmission in accordance with the configuration parameter comprises:
when the first UCI does not need to be transmitted on the PUSCH, determining the PUSCH transmission resource in accordance with the configuration parameter, and performing the PUSCH transmission on the determined PUSCH transmission resource; or
when the first UCI needs to be transmitted on the PUSCH, determining the PUSCH transmission resource in accordance with the configuration parameter, and performing the PUSCH transmission on the determined PUSCH transmission resource, wherein the PUSCH carries the first UCI;
and
the determining the PUSCH transmission resource in accordance with the configuration parameter and whether there is the first UCI to be transmitted on the PUSCH and performing the PUSCH transmission on the determined PUSCH transmission resource comprises one of following modes:

mode 1:
the configuration parameter comprises at least two PUSCH resources;
when the first UCI does not need to be transmitted on the PUSCH, performing the PUSCH transmission on a first PUSCH resource in the at least two PUSCH resources;
when the first UCI needs to be transmitted on the PUSCH, performing the PUSCH transmission on a second PUSCH resource in the at least two PUSCH resources, wherein the PUSCH carries the first UCI,
wherein the second PUSCH resource is a PUSCH resource in the at least two PUSCH resources other than the first PUSCH resource, and a size of the first PUSCH resource is smaller than a size of the second PUSCH resource;

mode 2:
when the first UCI does not need to be transmitted on the PUSCH, determining the PUSCH transmission resource in accordance with the configuration parameter, and performing the PUSCH transmission on the determined PUSCH transmission resource;
when the first UCI needs to be transmitted on the PUSCH, determining the PUSCH transmission resource in accordance with the configuration parameter, determining a target PUSCH transmission resource in accordance with the determined PUSCH transmission resource and an additional resource, and performing the PUSCH transmission on the target PUSCH transmission resource, wherein the PUSCH carries the first UCI.

2. The transmission method according to claim 1, wherein when the second PUSCH resource comprises more than one PUSCH resource, different PUSCH resources in the second PUSCH resource are used to transmit the first UCIs having different quantities of bits, wherein sizes of different PUSCH resources in the second PUSCH resource are different; or
wherein determining the target PUSCH transmission resource in accordance with the determined PUSCH transmission resource and the additional resource comprises at least one of following modes:

mode 3:
the additional resource comprises number X1 of Orthogonal Frequency Division Multiplexing (OFDM) symbols;
adding number X1 of OFDM symbols before a first OFDM symbol of the determined PUSCH transmission resource, to obtain the target PUSCH transmission resource; or adding number X1 of OFDM symbols after a last OFDM symbol of the determined PUSCH transmission resource, to obtain the target PUSCH transmission resource; or adding number X11 of OFDM symbols before the first OFDM symbol of the determined PUSCH transmission resource, and adding number X12 of OFDM symbols after the last OFDM symbol of the determined PUSCH transmission resource, to obtain the target PUSCH transmission resource, where X11+X12=X1; or mode 4:
the additional resource comprises number X2 of Resource Blocks (RBs);
adding number X2 of RBs before a first RB of the determined PUSCH transmission resource, to obtain the target PUSCH transmission resource; or adding number X2 of RBs after a last RB of the determined PUSCH transmission resource, to obtain the target PUSCH transmission resource; or adding X21 RBs before a first RB of the determined PUSCH transmission resource and adding number X22 of RBs after a last RB of the determined PUSCH transmission resource, to obtain the target PUSCH transmission resource, where X21+X22=X2;

wherein the numbers X1, X2, X11, X12, X21, X22 are positive integers, and X1, X11, X12 each represents a quantity of OFDM symbols and X2, X21, X22 each represents a quantity of RBs.

3. The transmission method according to claim 1, wherein the first UCI and the PUSCH satisfy at least one of following conditions:

a first condition where the first UCI is at least one of a Hybrid Automatic Repeat reQuest Acknowledgement (HARQ-ACK) or Channel State Information (CSI), and the PUSCH corresponds to a first type of service or a second type of service;

a second condition where the first UCI is at least one of an HARQ-ACK corresponding to the first type of service or CSI corresponding to the first type of service, and the PUSCH corresponds to the first type of service;

a third condition where the first UCI is at least one of an HARQ-ACK corresponding to a second type of service or CSI corresponding to the second type of service, and the PUSCH corresponds to the first type of service or the second type of service, wherein the first type of service is at least one of a service having a high priority level or a high significance level, or a Ultra Reliably & Low Latency Communications (URLLC) service;

the second type of service is at least one of a service having a low priority level or a low significance level, an enhanced Mobile Broadband (eMBB) service, or a non-URLLC service.

4. A reception method for a network device, comprising:
transmitting configuration information to a terminal, wherein the configuration information carries a configuration parameter of a Grant-Free (GF) Physical Uplink Shared Channel (PUSCH);
receiving PUSCH in accordance with the configuration parameter, wherein the configuration parameter is configured based on an existence of number A of bits of first Uplink Control information (UCI) to be transmitted on the PUSCH, and the number A represents a predetermined quantity of bits; or determining a PUSCH transmission resource in accordance with the configuration parameter and whether there is the first UCI to be transmitted on the PUSCH, and receiving the PUSCH on the determined PUSCH transmission resource;

wherein
the receiving the PUSCH in accordance with the configuration parameter comprises:
when the first UCI does not need to be transmitted on the PUSCH, determining the PUSCH transmission resource in accordance with the configuration parameter, and receiving the PUSCH on the determined PUSCH transmission resource; or
when the first UCI needs to be transmitted on the PUSCH, determining the PUSCH transmission resource in accordance with the configuration parameter, and receiving the PUSCH on the determined PUSCH transmission resource, wherein the PUSCH carries the first UCI;
and
the determining the PUSCH transmission resource in accordance with the configuration parameter and whether there is the first UCI to be transmitted on the PUSCH and receiving the PUSCH on the determined PUSCH transmission resource comprises one of following modes:

mode 1:
the configuration parameter comprises at least two PUSCH resources;
when the first UCI does not need to be transmitted on the PUSCH, receiving the PUSCH on a first PUSCH resource in the at least two PUSCH resources;
when the first UCI needs to be transmitted on the PUSCH, receiving the PUSCH on a second PUSCH resource in the at least two PUSCH resources, wherein the PUSCH carries the first UCI,
wherein the second PUSCH resource is a PUSCH resource in the at least two PUSCH resources other than the first PUSCH resource, and a size of the first PUSCH resource is smaller than a size of the second PUSCH resource;

mode 2:
when the first UCI does not need to be transmitted on the PUSCH, determining the PUSCH transmission resource in accordance with the configuration parameter, and receiving the PUSCH on the determined PUSCH transmission resource;
when the first UCI needs to be transmitted on the PUSCH, determining the PUSCH transmission resource in accordance with the configuration parameter, determining a target PUSCH transmission resource in accordance with the determined PUSCH transmission resource and an additional resource, and receiving the PUSCH on the target PUSCH transmission resource, wherein the PUSCH carries the first UCI.

5. The reception method according to claim 4, wherein when the second PUSCH resource comprises more than one PUSCH resource, different PUSCH resources in the second PUSCH resource are used to receive the first UCIs having different quantities of bits, wherein sizes of different PUSCH resources in the second PUSCH resource are different; or
wherein determining the target PUSCH transmission resource in accordance with the determined PUSCH transmission resource and the additional resource comprises at least one of following modes:

mode 3:
the additional resource comprises number X1 of Orthogonal Frequency Division Multiplexing (OFDM) symbols;
adding number X1 of OFDM symbols before a first OFDM symbol of the determined PUSCH transmission resource, to obtain the target PUSCH transmission resource; or adding number X1 of OFDM symbols after a last OFDM symbol of the determined PUSCH transmission resource, to obtain the target PUSCH transmission resource; or adding number X11 of OFDM symbols before the first OFDM symbol of the determined PUSCH transmission resource, and adding number X12 of OFDM symbols after the last OFDM symbol of the determined PUSCH transmission resource, to obtain the target PUSCH transmission resource, where X11+X12=X1; or mode 4:
the additional resource comprises number X2 of Resource Blocks (RBs);
adding number X2 of RBs before a first RB of the determined PUSCH transmission resource, to obtain the target PUSCH transmission resource; or adding number X2 of RBs after a last RB of the determined PUSCH transmission resource, to obtain the target PUSCH transmission resource; or adding X21 RBs before a first RB of the determined PUSCH transmission resource and adding number X22 of RBs after a last RB of the determined PUSCH transmission resource, to obtain the target PUSCH transmission resource, where X21+X22=X2;

wherein the numbers X1, X2, X11, X12, X21, X22 are positive integers, and X1, X11, X12 each represents a quantity of OFDM symbols and X2, X21, X22 each represents a quantity of RBs.

6. The reception method according to claim 4, wherein the first UCI and the PUSCH satisfy at least one of following conditions:
a first condition where the first UCI is at least one of a Hybrid Automatic Repeat reQuest Acknowledgement (HARQ-ACK) or Channel State Information (CSI), and the PUSCH corresponds to a first type of service or a second type of service;
a second condition where the first UCI is at least one of an HARQ-ACK corresponding to the first type of service or CSI corresponding to the first type of service, and the PUSCH corresponds to the first type of service;
a third condition where the first UCI is at least one of an HARQ-ACK corresponding to a second type of service or CSI corresponding to the second type of service, and the PUSCH corresponds to the first type of service or the second type of service,
wherein the first type of service is at least one of a service having a high priority level or a high significance level, or a Ultra Reliably & Low Latency Communications (URLLC) service;
the second type of service is at least one of a service having a low priority level or a low significance level, an enhanced Mobile Broadband (eMBB) service, or a non-URLLC service.

7. A network device, comprising a transceiver, a memory, a processor, and a program stored in the memory and capable of being executed by the processor, wherein the processor is configured to read the program to implement the reception method according to claim 4.

8. The network device according to claim 7, wherein when the second PUSCH resource comprises more than one PUSCH resource, different PUSCH resources in the second PUSCH resource are used to receive the first UCIs having different quantities of bits, wherein sizes of different PUSCH resources in the second PUSCH resource are different; or
wherein the processor is configured to execute the program to implement at least one of following modes:
mode 3:
the additional resource comprises number X1 of Orthogonal Frequency Division Multiplexing (OFDM) symbols;
adding number X1 of OFDM symbols before a first OFDM symbol of the determined PUSCH transmission resource, to obtain the target PUSCH transmission resource; or adding number X1 of OFDM symbols after a last OFDM symbol of the determined PUSCH transmission resource, to obtain the target PUSCH transmission resource; or adding number X11 of OFDM symbols before the first OFDM symbol of the determined PUSCH transmission resource, and adding number X12 of OFDM symbols after the last OFDM symbol of the determined PUSCH transmission resource, to obtain the target PUSCH transmission resource, where X11+X12=X1; or mode 4:
the additional resource comprises number X2 of Resource Blocks (RBs);
adding number X2 of RBs before a first RB of the determined PUSCH transmission resource, to obtain the target PUSCH transmission resource; or adding number X2 of RBs after a last RB of the determined PUSCH transmission resource, to obtain the target PUSCH transmission resource; or adding X21 RBs before a first RB of the determined PUSCH transmission resource and adding number X22 of RBs after a last RB of the determined PUSCH transmission resource, to obtain the target PUSCH transmission resource, where X21+X22=X2;
wherein the numbers X1, X2, X11, X12, X21, X22 are positive integers, and X1, X11, X12 each represents a quantity of OFDM symbols and X2, X21, X22 each represents a quantity of RBs.

9. The network device according to claim 7, wherein the first UCI and the PUSCH satisfy at least one of following conditions:
a first condition where the first UCI is at least one of a Hybrid Automatic Repeat reQuest Acknowledgement (HARQ-ACK) or Channel State Information (CSI), and the PUSCH corresponds to a first type of service or a second type of service;
a second condition where the first UCI is at least one of an HARQ-ACK corresponding to the first type of service or CSI corresponding to the first type of service, and the PUSCH corresponds to the first type of service;
a third condition where the first UCI is at least one of an HARQ-ACK corresponding to a second type of service or CSI corresponding to the second type of service, and the PUSCH corresponds to the first type of service or the second type of service,
wherein the first type of service is at least one of a service having a high priority level or a high significance level, or a Ultra Reliably & Low Latency Communications (URLLC) service;
the second type of service is at least one of a service having a low priority level or a low significance level, an enhanced Mobile Broadband (eMBB) service, or a non-URLLC service.

10. A terminal, comprising a transceiver, a memory, a processor, and a program stored in the memory and capable of being executed by the processor, wherein the processor is configured to execute the program to:
receive configuration information transmitted from a network device, to obtain a configuration parameter of a Grant-Free (GF) Physical Uplink Shared Channel (PUSCH);
perform PUSCH transmission in accordance with the configuration parameter, wherein the configuration parameter is configured based on an existence of number A of bits of first Uplink Control information (UCI) to be transmitted on the PUSCH, and the number A represents a predetermined quantity of bits; or determine a PUSCH transmission resource in accordance with the configuration parameter and whether there is the first UCI to be transmitted on the PUSCH, and performing PUSCH transmission on the determined PUSCH transmission resource;
wherein when the processor executes the program to perform PUSCH transmission in accordance with the configuration parameter, the processor is configured to execute the program to:

when the first UCI does not need to be transmitted on the PUSCH, determine the PUSCH transmission resource in accordance with the configuration parameter, and perform the PUSCH transmission on the determined PUSCH transmission resource; or when the first UCI needs to be transmitted on the PUSCH, determine the PUSCH transmission resource in accordance with the configuration parameter, and perform the PUSCH transmission on the determined PUSCH transmission resource, wherein the PUSCH carries the first UCI;

and when the processor executes the program to determine the PUSCH transmission resource in accordance with the configuration parameter and whether there is the first UCI to be transmitted on the PUSCH and perform the PUSCH transmission on the determined PUSCH transmission resource, the processor is configured to execute the program to implement one of following modes:

mode 1:

the configuration parameter comprises at least two PUSCH resources;

when the first UCI does not need to be transmitted on the PUSCH, performing the PUSCH transmission on a first PUSCH resource in the at least two PUSCH resources;

when the first UCI needs to be transmitted on the PUSCH, performing the PUSCH transmission on a second PUSCH resource in the at least two PUSCH resources, wherein the PUSCH carries the first UCI, wherein the second PUSCH resource is a PUSCH resource in the at least two PUSCH resources other than the first PUSCH resource, and a size of the first PUSCH resource is smaller than a size of the second PUSCH resource;

mode 2:

when the first UCI does not need to be transmitted on the PUSCH, determining the PUSCH transmission resource in accordance with the configuration parameter, and performing the PUSCH transmission on the determined PUSCH transmission resource;

when the first UCI needs to be transmitted on the PUSCH, determining the PUSCH transmission resource in accordance with the configuration parameter, determining a target PUSCH transmission resource in accordance with the determined PUSCH transmission resource and an additional resource, and performing the PUSCH transmission on the target PUSCH transmission resource, wherein the PUSCH carries the first UCI.

11. The terminal according to claim 10, wherein when the second PUSCH resource comprises more than one PUSCH resource, different PUSCH resources in the second PUSCH resource are used to transmit the first UCIs having different quantities of bits, wherein sizes of different PUSCH resources in the second PUSCH resource are different; or wherein the processor is configured to execute the program to implement at least one of following modes:

mode 3:

the additional resource comprises number X1 of Orthogonal Frequency Division Multiplexing (OFDM) symbols;

adding number X1 of OFDM symbols before a first OFDM symbol of the determined PUSCH transmission resource, to obtain the target PUSCH transmission resource; or adding number X1 of OFDM symbols after a last OFDM symbol of the determined PUSCH transmission resource, to obtain the target PUSCH transmission resource; or adding number X11 of OFDM symbols before the first OFDM symbol of the determined PUSCH transmission resource, and adding number X12 of OFDM symbols after the last OFDM symbol of the determined PUSCH transmission resource, to obtain the target PUSCH transmission resource, where X11+X12=X1; or mode 4:

the additional resource comprises number X2 of Resource Blocks (RBs);

adding number X2 of RBs before a first RB of the determined PUSCH transmission resource, to obtain the target PUSCH transmission resource; or adding number X2 of RBs after a last RB of the determined PUSCH transmission resource, to obtain the target PUSCH transmission resource; or adding X21 RBs before a first RB of the determined PUSCH transmission resource and adding number X22 of RBs after a last RB of the determined PUSCH transmission resource, to obtain the target PUSCH transmission resource, where X21+X22=X2;

wherein the numbers X1, X2, X11, X12, X21, X22 are positive integers, and X1, X11, X12 each represents a quantity of OFDM symbols and X2, X21, X22 each represents a quantity of RBs.

12. The terminal according to claim 10, wherein the first UCI and the PUSCH satisfy at least one of following conditions:

a first condition where the first UCI is at least one of a Hybrid Automatic Repeat reQuest Acknowledgement (HARQ-ACK) or Channel State Information (CSI), and the PUSCH corresponds to a first type of service or a second type of service;

a second condition where the first UCI is at least one of an HARQ-ACK corresponding to the first type of service or CSI corresponding to the first type of service, and the PUSCH corresponds to the first type of service;

a third condition where the first UCI is at least one of an HARQ-ACK corresponding to a second type of service or CSI corresponding to the second type of service, and the PUSCH corresponds to the first type of service or the second type of service, wherein the first type of service is at least one of a service having a high priority level or a high significance level, or a Ultra Reliably & Low Latency Communications (URLLC) service;

the second type of service is at least one of a service having a low priority level or a low significance level, an enhanced Mobile Broadband (eMBB) service, or a non-URLLC service.

* * * * *